(12) United States Patent
Lee et al.

(10) Patent No.: US 9,020,051 B2
(45) Date of Patent: Apr. 28, 2015

(54) METHOD AND BASE STATION FOR RECEIVING REFERENCE SIGNAL, AND METHOD AND USER EQUIPMENT FOR RECEIVING REFERENCE SIGNAL

(75) Inventors: Moon Il Lee, Anyang-si (KR); Jae Hoon Chung, Anyang-si (KR); Hyun Soo Ko, Anyang-si (KR); Seung Hee Han, Anyang-si (KR)

(73) Assignee: LG Electronics Inc., Seoul (KR)

(*) Notice: Subject to any disclaimer, the term of this patent is extended or adjusted under 35 U.S.C. 154(b) by 1045 days.

(21) Appl. No.: 13/072,553

(22) Filed: Mar. 25, 2011

(65) Prior Publication Data

US 2011/0235743 A1    Sep. 29, 2011

Related U.S. Application Data

(60) Provisional application No. 61/317,709, filed on Mar. 26, 2010, provisional application No. 61/392,480, filed on Oct. 13, 2010.

(30) Foreign Application Priority Data

Mar. 24, 2011    (KR) .......................... 10-2011-0026299

(51) Int. Cl.
*H04K 1/10* (2006.01)
*H04L 27/28* (2006.01)
*H04L 5/00* (2006.01)

(52) U.S. Cl.
CPC .................................... *H04L 5/0048* (2013.01)

(58) Field of Classification Search
CPC . H04W 72/042; H04W 24/10; H04W 28/044; H04L 1/0026; H04L 1/1854; H04B 7/0626; H04B 7/0632
USPC .......................... 375/260, 267, 295, 316, 347
See application file for complete search history.

(56) References Cited

U.S. PATENT DOCUMENTS

| 2010/0008282 A1 | 1/2010 | Bhattad et al. |
| 2010/0027483 A1 | 2/2010 | Ofuji et al. |
| 2010/0054161 A1 | 3/2010 | Montojo et al. |

(Continued)

FOREIGN PATENT DOCUMENTS

| CN | 101507311 | 8/2009 |
| KR | 10-2009-0033357 | 4/2009 |

(Continued)

OTHER PUBLICATIONS

Sajid Hussain, "Dynamic Radio Resource Management in 3GPP LTE", Blekinge Institute of Technology, Jan. 2009.

(Continued)

*Primary Examiner* — Curtis Odom

(74) *Attorney, Agent, or Firm* — Lee, Hong, Degerman, Kang & Waimey

(57) ABSTRACT

A base station does not transmit any reference signal (RS) for channel measurement in a subframe in which transmission of an RS collides with transmission of a synchronization signal or a broadcast signal or in a resource block including the synchronization signal or the broadcast signal in the subframe. A user equipment assumes that any RS for channel measurement is not transmitted in a subframe or in a resource block when transmission of an RS collides with transmission of a synchronization signal or a broadcast signal in the subframe or in the resource block.

14 Claims, 17 Drawing Sheets

(56) References Cited

U.S. PATENT DOCUMENTS

2012/0020230 A1* 1/2012 Chen et al. .................. 370/252
2013/0094411 A1* 4/2013 Zhang ........................ 370/281

FOREIGN PATENT DOCUMENTS

KR   10-2010-0091130    8/2010
WO      2010/106729    9/2010

OTHER PUBLICATIONS

Korean Intellectual Property Office Application Serial No. 10-2011-0026299, Notice of Allowance dated Jan. 11, 2013, 2 pages.
The State Intellectual Property Office of the People's Republic of China Application Serial No. 201180016256.6, Office Action dated Oct. 10, 2014, 7 pages.
ZTE Corporation, "CSI-RS Pattern Design for LTE-Advanced," 3GPP TSG-RAN WG1 Meeting #60, R1-100969, Feb. 2010, 7 pages.

* cited by examiner

METHOD AND BASE STATION FOR RECEIVING REFERENCE SIGNAL, AND METHOD AND USER EQUIPMENT FOR RECEIVING REFERENCE SIGNAL

CROSS-REFERENCE TO RELATED APPLICATIONS

Pursuant to 35 U.S.C. §119, this application claims the benefit of earlier filing date and right of priority to Korean Patent Application No. 10-2011-0026299, filed on Mar. 24, 2011, and also claims the benefit of U.S. Provisional Application Ser. Nos. 61/317,709, filed on Mar. 26, 2010, and 61/392,480, filed on Oct. 13, 2010, the contents of which are all incorporated by reference herein in their entirety.

BACKGROUND OF THE INVENTION

1. Field of the Invention

The present invention relates to a wireless communication system, and more particularly, to a method and apparatus for transmitting a reference signal, and method and apparatus for receiving the reference signal.

2. Discussion of the Related Art

A transmitter in a wireless communication system transmits signals through radio frequency channels. During signal transmission, unexpected distortion may occur in the transmission signals. Also, the transmitter may precode the signals and transmit the precoded signals to a receiver. To efficiently receive and detect original signals, the receiver needs to receive information about the state of the radio channels, information about interference with transmission signals, and/or information about demodulation of the transmission signals. Using such information, the receiver corrects distortion occurring in the transmission signals, thereby obtaining the original signals with high accuracy.

To this end, it is necessary to define a method for appropriately configuring reference signals for use in channel measurement and/or interference measurement and transmitting the configured reference signals to the receiver, and a method for accurately measuring channels and interference by the receiver and transmitting the measured results to the transmitter.

SUMMARY OF THE INVENTION

The present invention provides a method and apparatus for configuring a reference signal for channel measurement and a method and apparatus for transmitting the reference signal.

The present invention provides a method and apparatus for configuring a reference signal for channel measurement together with other physical signals.

The present invention provides a method and apparatus for transmitting other physical signals together with a reference signal for channel measurement.

The present invention provides a method and apparatus for receiving a reference signal for channel measurement and perform channel measurement by using the reference signal.

The present invention provides a method and apparatus for transmitting channel information measured based on a reference signal for channel measurement.

It is to be understood that technical objects to be achieved by the present invention are not limited to the aforementioned technical objects and other technical objects which are not mentioned will be apparent from the following description to the person with an ordinary skill in the art to which the present invention pertains.

To achieve these objects and other advantages and in accordance with the purpose of the invention, as embodied and broadly described herein, a method for receiving one or more reference signals for channel measurement by a user equipment in a wireless communication system comprises: receiving transmission information of the one or more reference signals from a base station; determining subframes configured for transmission of the one or more reference signals, and first resource elements for the transmission of the one or more reference signals, based on the transmission information; and receiving the one or more reference signals in at least one of the subframes, wherein the one or more reference signals are received in a subframe in which a first resource element for transmission of a reference signal collides with a second resource element for transmission of a synchronization signal or a broadcast signal.

In another aspect of the present invention, a user equipment for receiving one or more reference signals for channel measurement in a wireless communication system comprises: a receiver configured to receive transmission information of the one or more reference signals from a base station; and a processor configured to control the receiver, wherein the processor is configured to determine subframes configured for transmission of the reference signal, and first resource element for transmission of the one or more reference signals, based on the transmission information and configured to control the receiver to receive the one or more reference signals in at least one of the subframes, and wherein the processor assumes that the base station does not transmits the one or more reference signals in a subframe in which a first resource element for transmission of a reference signal for channel measurement collides with a second resource element for transmission of a synchronization signal or a broadcast signal.

In a further aspect of the present invention, a method for transmitting one or more reference signals for channel measurement by a base station in a wireless communication system comprises: transmitting transmission information of the one or more reference signals to a user equipment, and transmitting the one or more reference signals in at least one of subframes configured for transmission of the one or more reference signals according to the transmission information, wherein the one or more reference signals are not transmitted in a subframe in which a first resource element for transmission of a reference signal for channel measurement collides with a second resource element for transmission of a synchronization signal or a broadcast signal.

In still another aspect of the present invention, a base station for transmitting one or more reference signals for channel measurement in a wireless communication system comprises: a transmitter, and a processor for controlling the transmitter to transmit transmission information of the one or more reference signals to a user equipment and controlling the transmitter to transmit the one or more reference signals in at least one of subframes configured for transmission of the one or more reference signals according to the transmission information, wherein the one or more reference signals are not transmitted in a subframe in which a first resource element for transmission of a reference signal for channel measurement collides with a second resource element for transmission of a synchronization signal or a broadcast signal.

In each aspect of the present invention, the user equipment may receive the one or more reference signals in a subframe in which no first resource element collides with the second resource element.

In each aspect of the present invention, the user equipment may derive channel measurement based on the one or more reference signals.

In each aspect of the present invention, the transmission information may include at least one of information indicating the number of antenna ports used to transmit the one or more reference signals, information indicating positions of the first resource elements in a resource block, and information indicating a transmission period and a subframe offset for the one or more reference signals.

The aforementioned technical solutions are only a part of the embodiments of the present invention, and various modifications to which technical features of the present invention are applied could be understood by the person with ordinary skill in the art to which the present invention pertains, based on the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
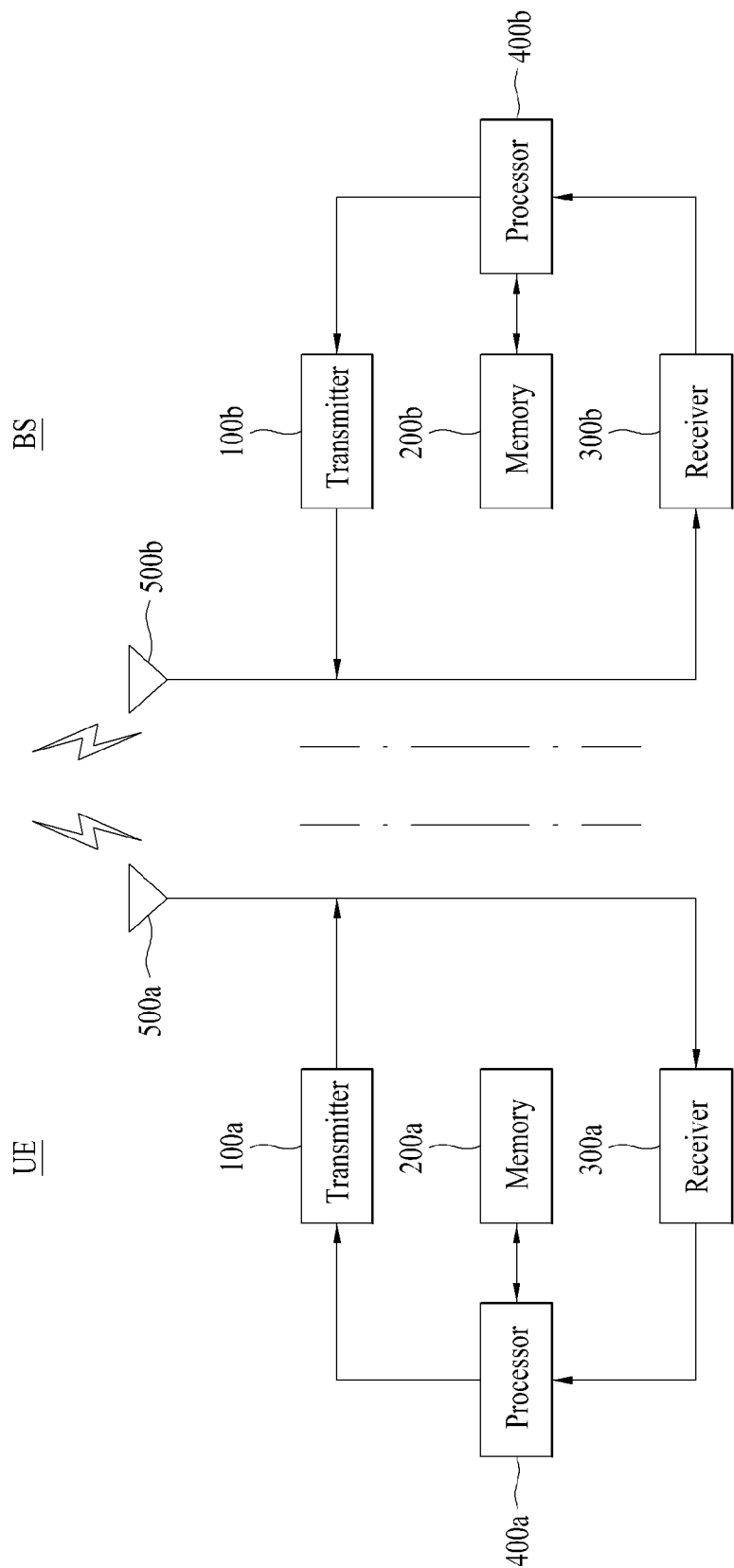
FIG. 1 is a block diagram of a UE and a BS for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

Hereinafter, PDCCH (Physical Downlink Control CHannel)/PCFICH (Physical Control Format Indicator CHannel)/PHICH (Physical Hybrid-ARQ Indicator CHannel)/PDSCH (Physical Downlink Shared CHannel)/DRS (Dedicated Reference Signal)/CRS (Common Reference Signal)/DMRS (DeModulation Reference Signal)/CSI-RS (Channel State Information Reference Signal) RE represents an RE assigned to or available for PDCCH/PCFICH/PHICH/PDSCH/DRS/CRS/DMRS/CSI-RS. In particular, a resource element (RE)

carrying a reference signal shall be named RS RE and a resource element (RE) carrying control information or data shall be named data RE.

In addition, symbol/carrier/subcarrier to which DRS/CRS/DMRS/CSI-RS is assigned is referred to as DRS/CRS/DMRS/CSI-RS symbol/carrier/subcarrier. For example, a symbol to which CSI-RS is assigned is referred to as a CSI-RS symbol, and a subcarrier to which CSI-RS is assigned is referred to as a CSI-RS subcarrier. A subframe configured for CSI-RS transmission is referred to as a CSI-RS subframe. A subframe in which a broadcast signal (e.g. Physical Broadcast CHannel (PBCH)) is transmitted is referred to as a broadcast signal subframe or a PBCH subframe. A subframe in which a synchronization signal (e.g. a Primary Synchronization Signal (PSS) and/or a Secondary Synchronization Signal (SSS)) is transmitted is referred to as a synchronization signal subframe or a PSS/SSS subframe.

In the present invention, a CSI-RS/DRS antenna port refers to an antenna port for transmitting a CSI-RS/DRS among antenna ports of a BS. If all the antenna ports within the BS are configured to transmit CSI-RS(s)/DRS(s), then all the antenna ports become CSI-RS(s)/DRS(s) antenna ports, and if some antenna ports within the BS are configured to transmit the CSI-RS/DRS, some of the antenna ports configured to transmit the CSI-RS(s)/DRS(s) becomes CSI-RS/DRS antenna ports. One CSI-RS antenna port transmits a corresponding CSI-RS on RE(s) and one DRS antenna port transmits a corresponding DRS on RE(s) other than CSI-RS REs.

Meanwhile, in the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

Hereinafter, the case where a specific signal is not actually transmitted even though it has been mapped to a frame, subframe, slot, symbol, carrier, or subcarrier will be referred to as 'transmission of the specific signal is dropped, muted, null, or blanked'. For example, if a transmitter transmits a specific signal at a transmission power of zero on a prescribed RE to which the specific signal is mapped although the transmitter has configured the specific signal, this may be expressed as 'the transmitter drops transmission of the specific signal', 'the transmitter mutes or blanks the prescribed RE', or 'the transmitter transmits a null signal on the prescribed RE'.

Meanwhile, in the present invention, the term "cell" refers to a certain geographical area to which a BS or an antenna group provides a communication service in the present invention. Therefore, communication with a specific cell may be equivalent to communication with an antenna group that provides a communication service in the specific cell. A downlink/uplink signal in the specific cell is a downlink/uplink signal from or to the antenna group that provides a communication service in the specific cell. In addition, the channel state/quality of the specific cell is the channel state/quality of a channel or communication link established between the antenna group and a specific UE in a geographical area corresponding to the specific cell.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
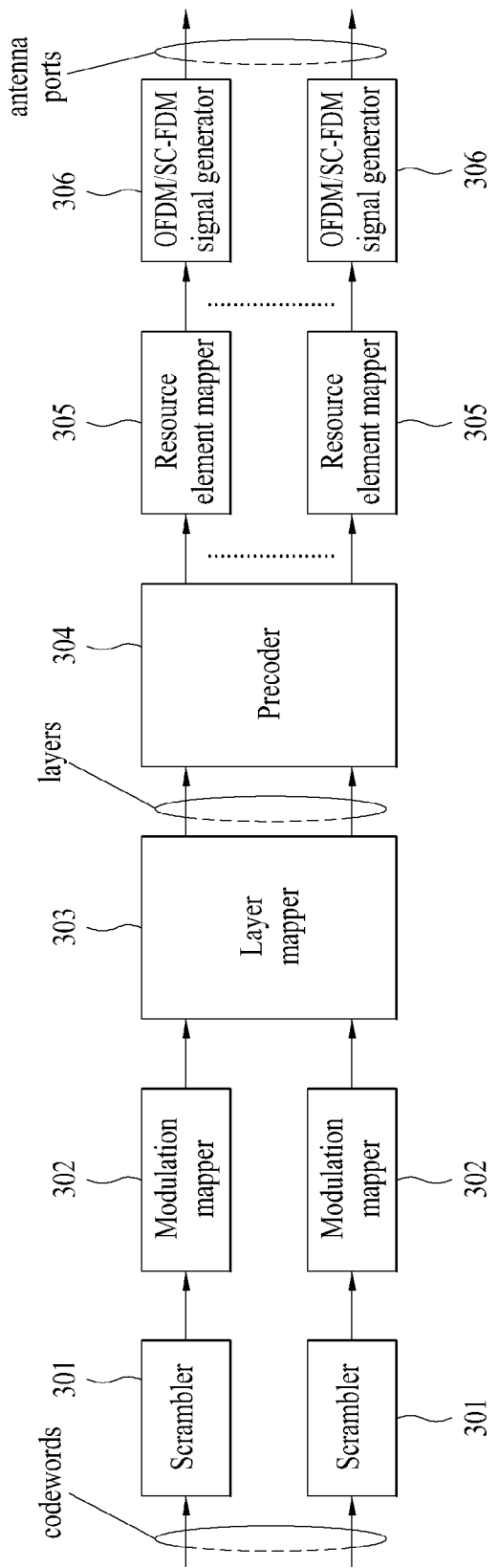
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing/Single Carrier Frequency Division Multiplexing (OFDM/SC-FDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-N$_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM/SC-FDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-N$_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is downconverted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers 300a and 300b receive signals transmitted by SC-FDMA, each of the receivers 300a and 300b further includes an IFFT module. The IFFT module IFFT-processes the antenna-specific symbols recovered by the RE demapper and outputs the IFFT symbol to the multiplexer.

Figure 3:
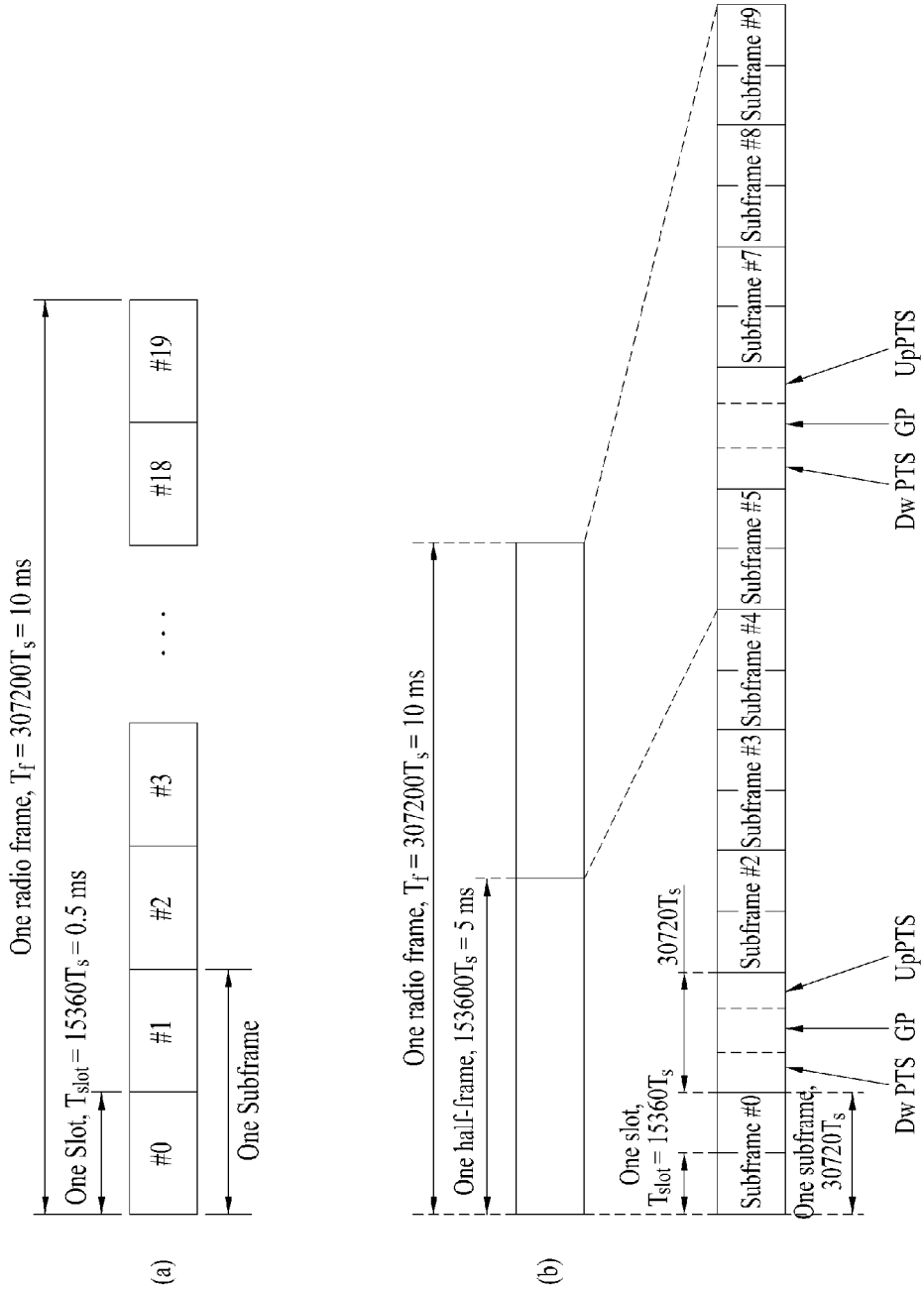
FIG. 3 illustrates an exemplary structure of a radio frame in a wireless communication system.

While it has been described in FIGS. 2 and 3 that each of the transmitters 100a and 100b includes the scramblers 301, the modulation mappers 302, the layer mapper 303, the precoder 304, the RE mappers 305, and the OFDM/SC-FDM signal generators 306, it may be further contemplated that the scramblers 301, the modulation mappers 302, the layer mapper 303, the precoder 304, the RE mappers 305, and the OFDM/SC-FDM signal generators 306 are incorporated into each of the processors 400a and 400b of the transmitters 100a and 100b. Likewise, while it has been described in FIGS. 2 and 3 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC-FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC-FDM signal generators 306 are included in the processors 400a and 400b or the signal recoverer, the multiplexer, and the channel demodulator are included in the processors 400a and 400b, embodiments of the present invention are applicable in the same manner.

FIG. 3 illustrates an exemplary structure of a radio frame in a wireless communication system. Particularly, FIG. 3(a) illustrates a radio frame according to a Frame Structure type 1 (FS-1) of a 3GPP LTE/LTE-A system, and FIG. 3(b) illustrates a radio frame according to a Frame Structure type 2 (FS-2) of the 3GPP LTE/LTE-A system. The frame structure of FIG. 3(a) may be applied to a Frequency Division Duplexing (FDD) mode and a half-FDD (H-FDD) mode. The frame structure of FIG. 3(b) may be applied to a Time Division Duplexing (TDD) mode.

Referring to FIG. 3, a 3GPP LTE/LTE-A radio frame is 10 ms (307,200 $T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. Each subframe is further divided into two slots, each of 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

Figure 4:
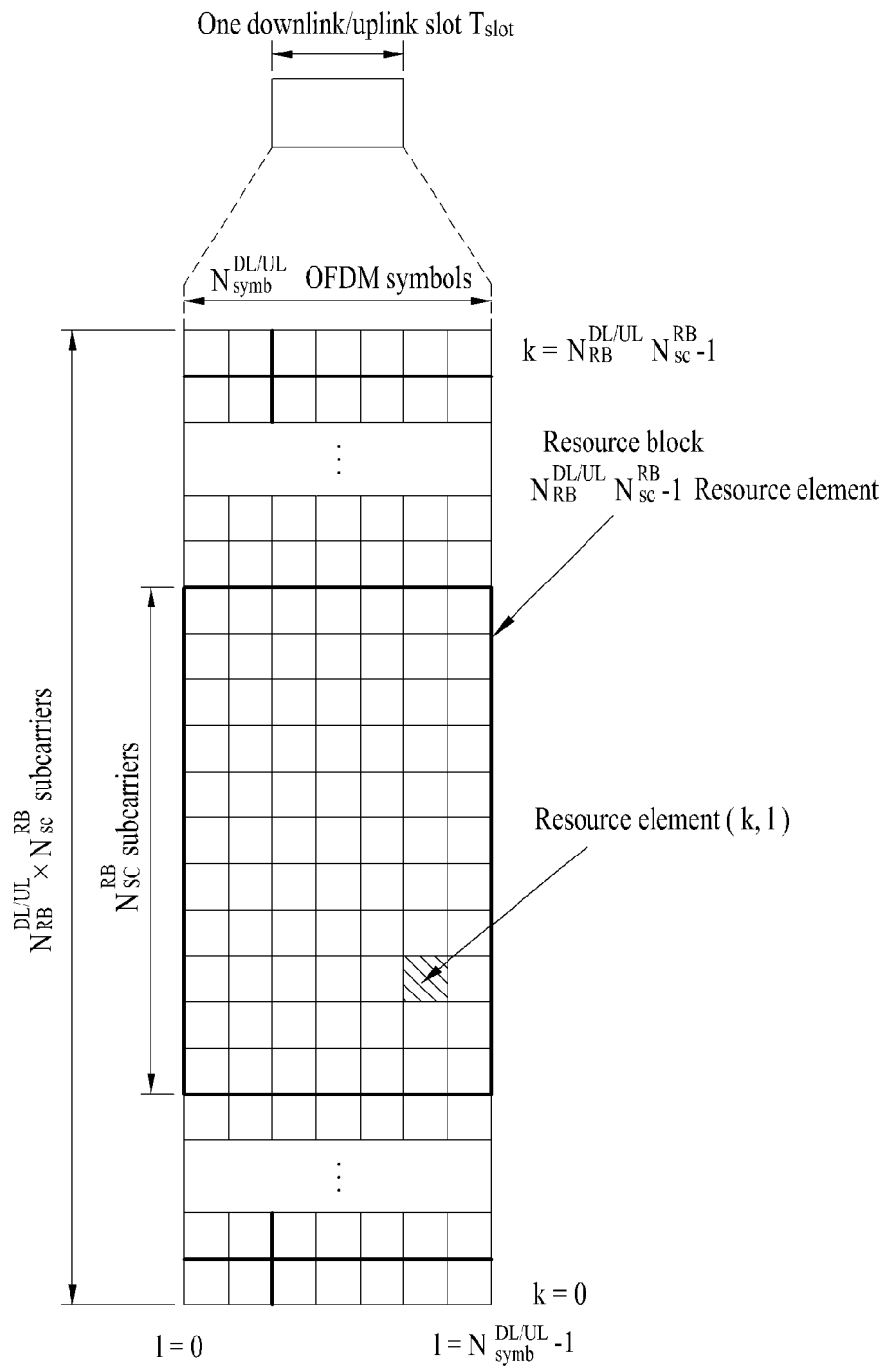
FIG. 4 illustrates an exemplary structure of a DL/UL slot in a wireless communication system.

FIG. 4 illustrates an exemplary structure of a DownLink/UpLink (DL/UL) slot in the wireless communication system. Specifically, FIG. 4 illustrates the structure of a resource grid in the 3GPP LTE/LTE-A system. There is one resource grid per antenna port.

Referring to FIG. 4, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 4 as having a slot with 7 OFDM symbols for illustrative purposes, embodiments of the present invention are also applicable to subframes with any other number of OFDM symbols. Each element in the resource grid for an antenna port is called Resource Element (RE). Each RE is formed by one OFDM symbol by one subcarrier. An RE is also referred to as a tone.

Referring to FIG. 4, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb} \times N^{RB}_{sc}$ REs.

Each RE in the resource grid per each antenna port may be uniquely identified by an index pair (k, l) in a slot. k is a frequency-domain index ranging from 0 to $N^{DL/UL}_{RB} \times N^{RB}_{sc}-1$ and l is a time-domain index ranging from 0 to $N^{DL/UL}_{symb}-1$.

Figure 5:
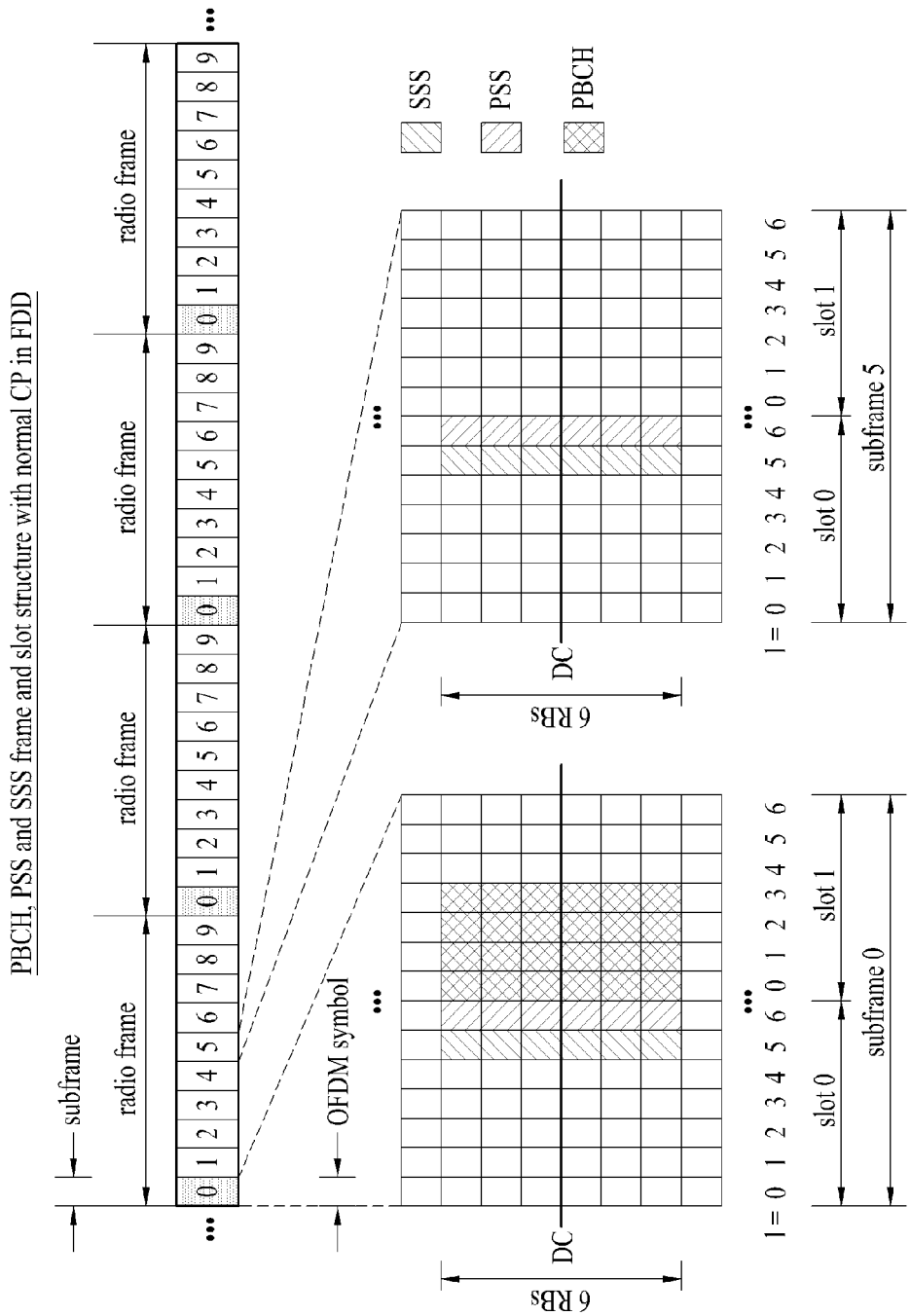
FIGS. 5 to 8 illustrate exemplary transmission of a synchronization signal and a broadcast signal in a wireless communication system.
Figure 6:
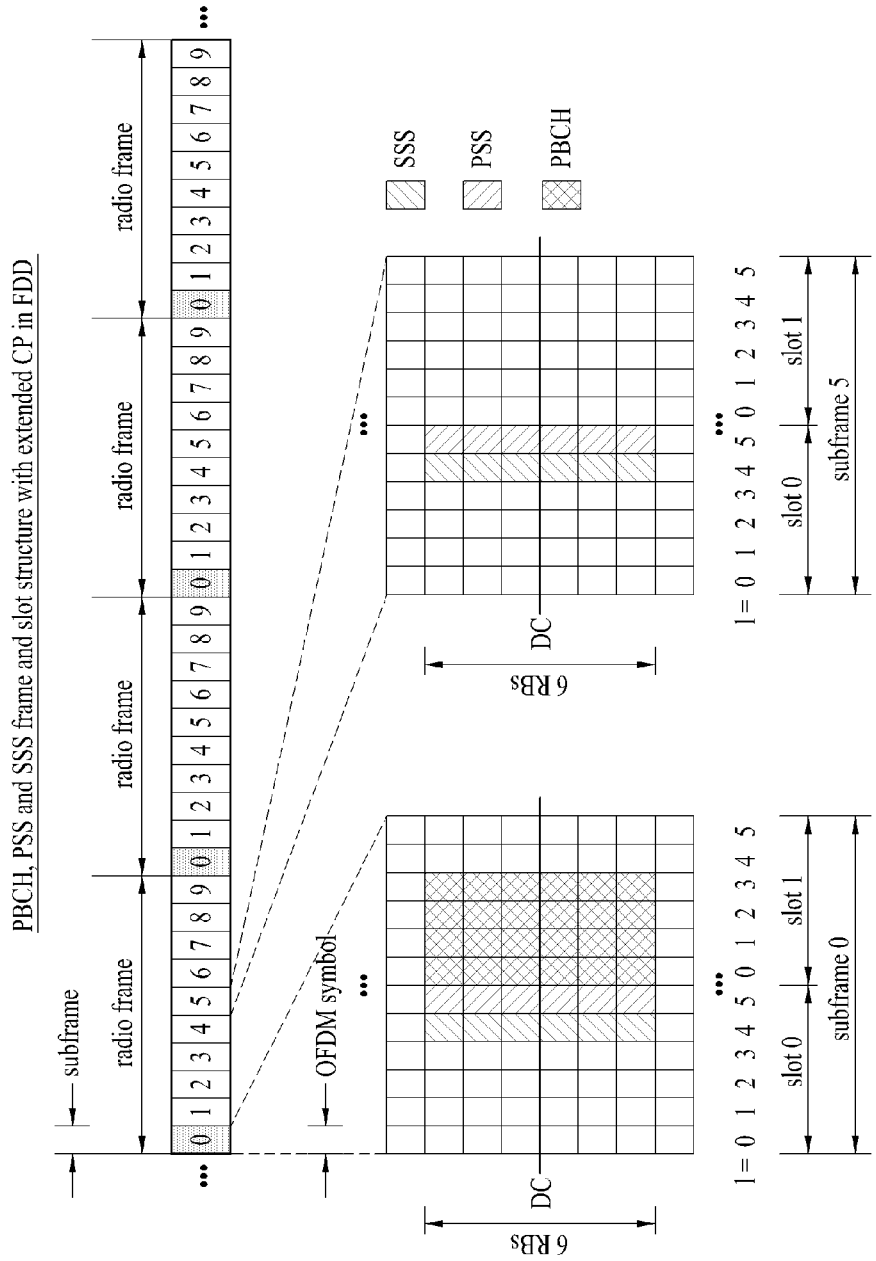
Figure 7:
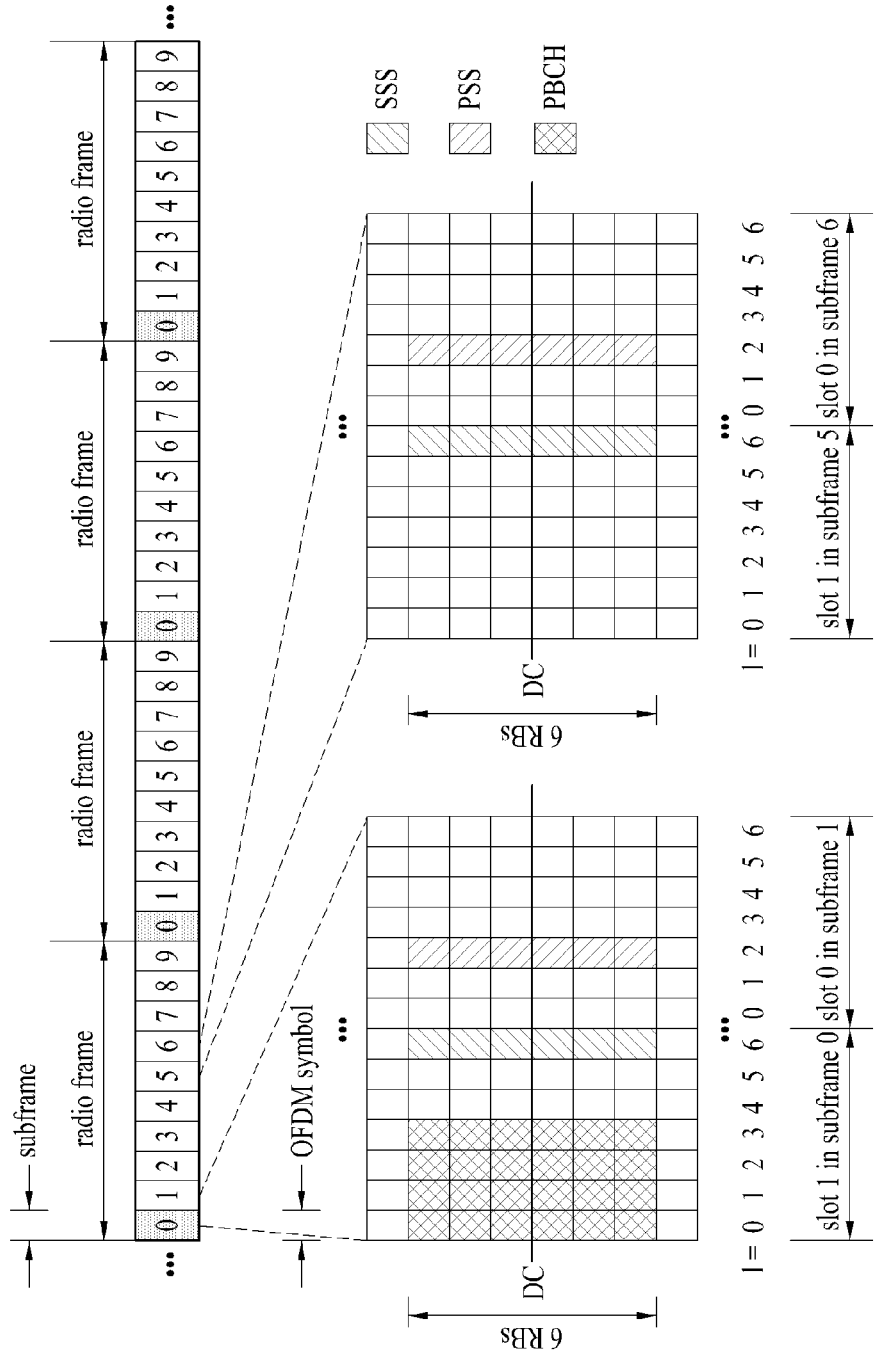
Figure 8:
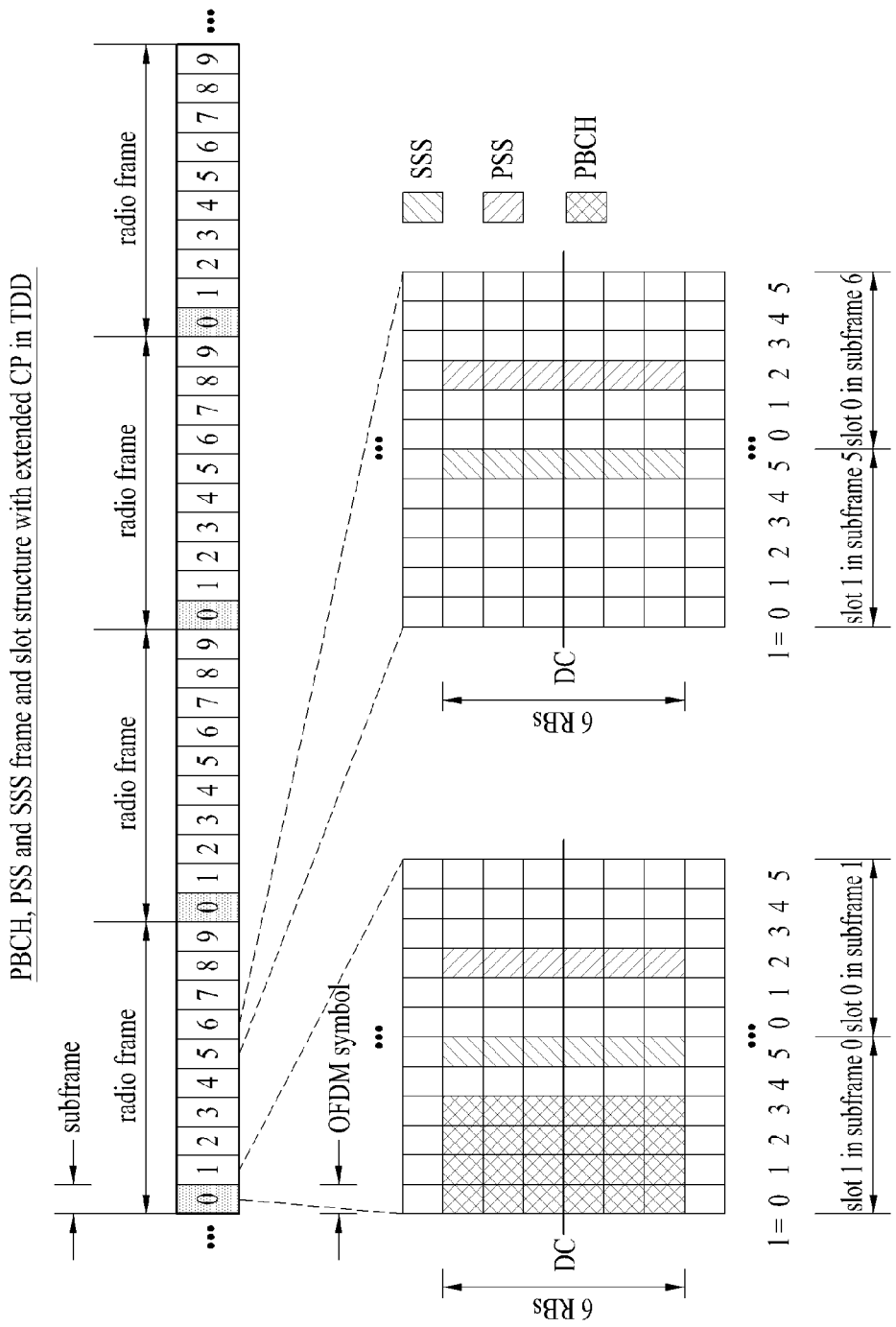

FIGS. 5 to 8 illustrate exemplary transmission of a synchronization signal and a broadcast signal in a wireless communication system. Especially, FIG. 5 illustrates synchronization signal and broadcast signal resources within a frame with a normal CP in FDD mode, FIG. 6 illustrates synchronization signal and broadcast signal resources within a frame with an extended CP in FDD mode, FIG. 7 illustrates synchronization signal and broadcast signal resources within a frame with a normal CP in TDD mode, and FIG. 8 illustrates synchronization signal and broadcast signal resources within a frame with a extended CP in TDD mode.

If a UE is powered on or enters a new cell, it performs initial cell search such as synchronization with a BS. For the initial cell search, the UE receives a PSS and an SSS from the BS, establishes synchronization with the BS, and obtains information such as a cell identity (ID). Thereafter, the UE receives, a broadcast signal, for example, a PBCH from the BS to obtain broadcast information belonging to a cell.

After performing the initial cell search, the UE receives a PDCCH and receives a PDSCH based on information conveyed in the PDCCH, so as to obtain more detailed system information. After performing the above-mentioned procedure, the UE may receive the PDCCH/PDSCH and transmit a Physical Uplink Shared Channel (PUSCH)/Physical Uplink Control Channel (PUCCH), as a general UL/DL signal transmission procedure. UL control information transmitted by the UE to the BS or DL control information received by the UE from the BS may include DL/UL ACKnowledgement (ACK)/Negative ACKnowledgement (NACK) signals, a Channel Quality Indicator (CQI), a Precoding Matrix Index (PMI), a Scheduling Request (SR), a Rank Indicator (RI), etc. The CQI, PMI, and RI are also called Channel State Information (CSI).

In order to perform communication according to a corresponding system, the UE should determine time and frequency parameters necessary to perform demodulation of a DL signal and transmission of a UL signal at an accurate time point and obtain system information necessary for system configuration thereof from the BS, by performing the above-described cell search process. The system information is configured by a Master Information Block (MIB) and System Information Blocks (SIBs). Each of the SIBs includes a set of functionally associated parameters and is divided into an MIB, an SIB type 1 (SIB1), an SIB type 2 (SIB2), SIB3-SIB8, and etc. according to parameters included.

The MIB includes the most frequently transmitted parameters essential for initial access to a network by the UE. The SIB 1 includes parameters necessary to determine whether a specific cell is suitable for cell selection, in addition to information about time-domain scheduling of other SIBs.

A synchronization signal and a broadcast signal will now be described in more detail with reference to FIGS. 5 to 8.

The synchronization signal is divided into a PSS and an SSS. The PSS is used to obtain time-domain synchronization, such as OFDM symbol synchronization and slot synchronization, and/or frequency synchronization. The SSS is used to obtain frame synchronization, a cell identifier (cell ID), and/or CP configuration of a cell (i.e. information as to whether a normal CP is used or an extended CP is used). Referring to FIGS. 5 to 8, the PSS and the SSS are transmitted through two OFDM symbols in every radio frame. Moreover, each of the PSS and the SSS is transmitted over 6 RBs. The 6 RBs includes 3 RBs of each of the left and right sides closest to a Direct Current (DC) subcarrier within a corresponding OFDM symbol.

The message contents of the PBCH are expressed as an MIB in a Radio Resource Control (RRC) layer. The PBCH includes a DL system bandwidth (DL BW), PHICH configuration, and a System Frame Number (SFN). Accordingly, the UE can explicitly recognize information about the DL BW, SFN, and PHICH configuration by receiving the PBCH. Meanwhile, information which can be implicitly recognized by the UE through the PBCH is the number of transmission antenna ports of the BS. The information about the number of transmission antenna ports of the BS is implicitly signaled by masking (e.g. an XOR operation) a sequence corresponding to the number of transmission antennas to a 16-bit Cyclic Redundancy Check (CRC) used for error detection of the PBCH. The PBCH is mapped to a physical resource after cell-specific scrambling, modulation, layer mapping, and precoding processes.

The PBCH is mapped to 4 subframes for 40 ms as shown in FIGS. 5 to 8. A timing of 40 ms is blindly detected and there is no explicit signaling about the timing of 40 ms. As can be seen from FIGS. 5 to 8, the PBCH is mapped to 4 OFDM symbols and 6 RBs within one subframe. In a time domain, the PBCH is transmitted through OFDM symbols 0 to 3 of a slot 1 within subframe 0 (i.e. the rear slot of subframe 0) of a radio frame. Meanwhile, in a frequency domain, the PBCH is mapped only to 72 center subcarriers irrespective of an actual system bandwidth. That is, the PBCH is transmitted through 6 RBs, which corresponds to the 72 center subcarriers based on a DC subcarrier which remains unused.

Meanwhile, various types of RSs are transmitted between a BS and a UE for the purposes of interference mitigation, estimation of the channel state between the BS and the UE, demodulation of signals transmitted between the BS and the UE, etc. An RS refers to a predefined signal with a special waveform known to both the BS and the UE, transmitted from the BS to the UE or from the UE to the BS. An RS is also called a pilot signal.

Figure 9:
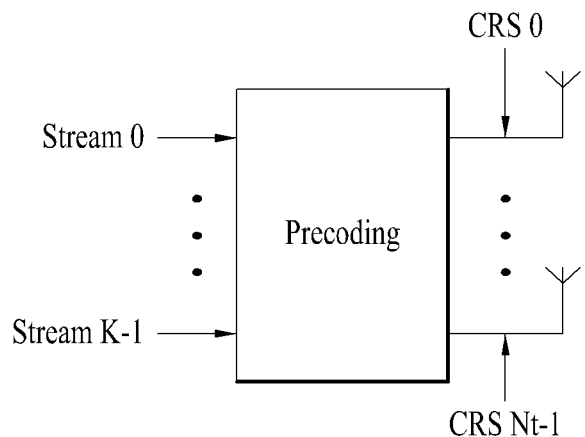
FIGS. 9 and 10 are conceptual diagrams of transmission of reference signals.
Figure 10:
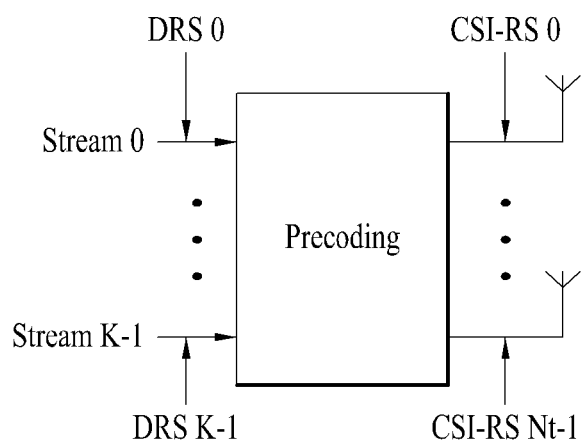

FIGS. 9 and 10 are conceptual diagrams of transmission of RSs. Especially, FIG. 9 illustrates exemplary transmission of CRSs, and FIG. 10 illustrates exemplary transmission of DRSs and CSI-RSs.

RSs are largely classified into DRSs and CRSs. The CRSs and DRSs are also called cell-specific RSs and DMRSs, respectively. The DMRSs are also called UE-specific RSs.

Referring to FIG. 9, CRSs are transmitted in every DL subframe in a cell supporting PDSCH transmission. CRSs are used for both purposes of demodulation and measurement and shared among all UEs within the cell. A CRS sequence is transmitted through every antenna port irrespective of the number of layers.

In a 3GPP LTE system supporting up to two layers, a BS simultaneously transmits one or two layers together with DRSs for demodulation of the layers and CRSs for estimation of a channel between a UE and the BS. In CRS based DL transmission, an RS should be transmitted by every physical antenna port. Accordingly, in CRS based DL transmission, overall RS overhead increases as the number of the physical antenna ports increases, thereby lowering data transmission efficiency. To solve this problem, a 3GPP LTE-A system, which can transmit more layers than a 3GPP LTE system, utilizes a DRS as an RS for demodulation instead of a CRS, wherein transmission overhead of the CRS increases as the number of the physical antenna ports increases.

Referring to FIG. 10, DRSs are usually used for demodulation, dedicated to a specific UE. DRSs used for data demodulation at a specific UE may be classified into pre-coded RSs and non-precoded RSs. If precoded RSs are used as DRSs, the DRSs are precoded with a precoding matrix used for precoding data symbols, and as many RS sequences as K layers are transmitted. K is equal to or less than the number of antenna ports, $N_t$. The K layers may be allocated to one or more UEs. If a plurality of UEs share the K layers, 1 UE to K UEs may receive the K layers in the same time/frequency resources.

In DRS based DL transmission, only virtual antenna ports rather than all physical antenna ports of the BS are required to transmit DRSs of the corresponding virtual antennas. Since the number of the virtual antenna ports is generally equal to or less than the number $N_t$ of the physical antenna ports, RS overhead of DRS based DL transmission is relatively reduced compared with RS overhead of CRS based DL transmission.

However, since a DRS using the same precoder as data is used only for demodulation, a Channel State Information RS (CSI-RS), which is an additional RS for measurement, is transmitted to a UE in the 3GPP LTE-A system so that the UE may estimate CSI. Unlike a CRS transmitted in every subframe, the CSI-RS is transmitted at a transmission interval of a plurality of subframes, based on the fact that channel state does not greatly vary over time. Due to such a transmission property of the CSI-RS, CSI-RS transmission overhead is lower than CRS transmission overhead.

The BS may cell-specifically transmit one or more CSI-RSs through one or more antenna ports, and the UE may receive the one or more CSI-RSs and measure a channel of the cell based on the one or more CSI-RSs. The UE may feed back CSI indicating a channel measurement result to the BS.

Figure 11:
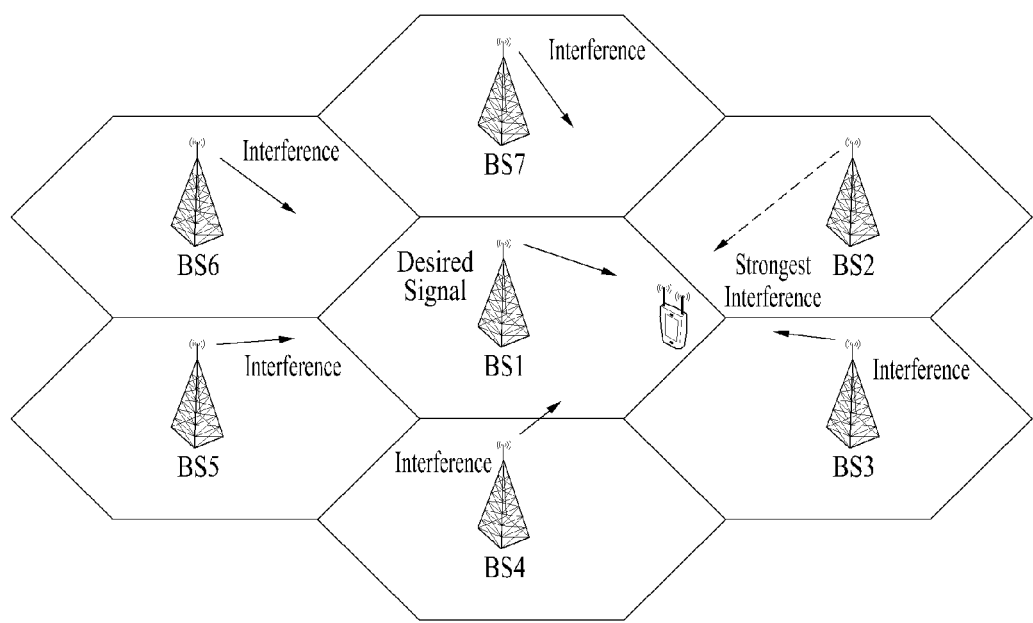
FIG. 11 illustrates the concept of a cellular wireless communication system.

FIG. 11 illustrates the concept of a cellular wireless communication system.

A plurality of BSs are deployed to cover the whole area of a specific wireless communication system and each BS is configured to provide a specific wireless communication service to UEs within a certain area. All BSs may provide the same communication service or different communication services. Recently, a multi-cellular wireless communication system has been designed such that a plurality of adjacent BSs can communicate with UEs in the same frequency band.

Figure 12:
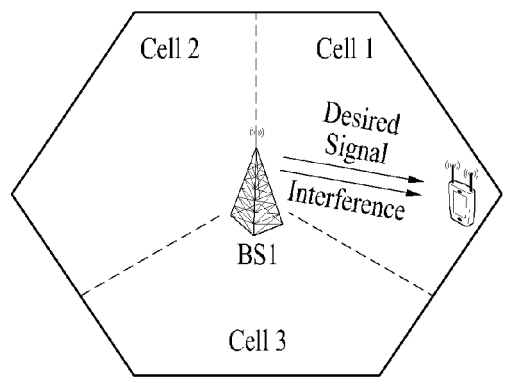
FIG. 12 illustrates the concept of a wireless communication system in which a plurality of sectors are defined in an independent cell.

FIG. 12 illustrates the concept of a wireless communication system in which a plurality of sectors are defined in an independent cell.

As stated before with reference to FIG. 11, each BS generally provides a communication service to a certain geographical area. Referring to FIG. 12, to improve system performance, the geographical area may be segmented into a plurality of smaller areas, Cell 1, Cell 2 and Cell 3. These smaller areas may be referred to as cells, sectors or segments. Signal interference occurs between cells of the same BS as illustrated in FIG. 12 as well as between cells of different BSs as illustrated in FIG. 11.

Negligence of the influence of interference from neighbor cells may lead to degradation of overall system performance in the multi-cellular system. For instance, referring to FIG. 11, if a specific UE is located between BS1 and BS2, signals transmitted to the UE in the same frequency band from BS1 and BS2 affect the UE with similar strengths. DL signals from BS1 and BS2 interfere with each other. If a communication system is configured without taking into account such interference, CSI (or Channel Quality Information (CQI)) that a UE feeds back to a BS becomes inaccurate, thereby making it difficult to optimize system throughput.

Thus, in order to optimize system throughput, it is important to configure a communication system such that a UE can accurately measure the channel state of a serving cell, taking into account the states of channels established between the UE and neighbor cells and/or the magnitudes of interference from the neighbor cells.

<CSI-RS Configuration>

For channel state estimation of a serving cell and a neighbor cell, cell-specific CSI-RSs are usually used.

Figure 13:
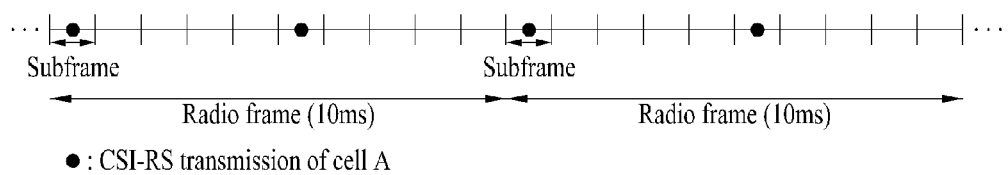
FIG. 13 illustrates exemplary transmission of a CSI-RS.

FIG. 13 illustrates exemplary transmission of a CSI-RS.

Since REs used to transmit RSs cannot be used for data transmission, data throughput decreases as RS overhead increases. In order to reduce RS overhead, a BS transmits CSI-RSs to a UE located in a cell to which the BS provides a communication service at a transmission interval of a plurality of subframes rather than in every subframe. Referring to FIG. 13, a BS transmits CSI-RS(s) through a prescribed antenna group belonging thereto every 5 subframes, for measurement of a channel established by the prescribed antenna group. Upon receiving a communication signal from the prescribed antenna group, a UE may receive a CSI-RS transmitted by each antenna port within the prescribed antenna group to estimate/measure the state/quality of the channel established between the antenna group and the UE.

To detect (or receive) CSI-RSs, the UE should determine subframes in which CSI-RSs of a corresponding cell are transmitted. The BS may transmit, to the UE, information about a transmission interval (or a transmission period) $T_{CSI-RS}$ at which subframes for CSI-RS transmission, (hereinafter referred to as CSI-RS subframes), are configured. Meanwhile, even though the CSI-RS transmission interval $T_{CSI-RS}$ is the same, CSI-RS subframes that the UE has to monitor become different if start subframes configured for first CSI-RS transmission differ. Accordingly, in order to specify the CSI-RS subframes, the BS may transmit information for indicating the first CSI-RS subframe to the UE, together with $T_{CSI-RS}$. For example, the BS may inform the UE of the CSI-RS subframes by signaling the CSI-RS transmission interval $T_{CSI-RS}$ and a subframe offset $\Delta_{CSI-RS}$ to the UE. The CSI-RS transmission interval $T_{CSI-RS}$ and the subframe offset $\Delta_{CSI-RS}$ may be transmitted to the UE in the form of CSI-RS subframe configuration information $I_{CSI-RS}$ as shown below.

TABLE 1

| $I_{CSI-RS}$ | $T_{CSI-RS}$ | Subframe offset $\Delta_{CSI-RS}$ |
|---|---|---|
| $I_{CSI-RS} \leq 4$ | 5 | $I_{CSI-RS}$ |
| $5 \leq I_{CSI-RS} \leq 14$ | 10 | $I_{CSI-RS}-5$ |
| $15 \leq I_{CSI-RS} \leq 34$ | 20 | $I_{CSI-RS}-15$ |
| $35 \leq I_{CSI-RS} \leq 74$ | 40 | $I_{CSI-RS}-35$ |
| $75 \leq I_{CSI-RS} \leq 154$ | 80 | $I_{CSI-RS}-75$ |

In Table 1, $I_{CSI-RS}$ represents a duty cycle and a subframe offset for CSI-RS transmission. Referring to Table 1, if $I_{CSI-RS}$ is equal to or larger than 5 and equal to or smaller than 14, CSI-RSs are transmitted in every 10 subframes, starting from a subframe with number $I_{CSI-RS}-5$ in a radio frame. $I_{CSI-RS}$ may be determined by higher layer signaling such as Medium Access Control (MAC) signaling or Radio Resource Control (RRC) signaling. $I_{CSI-RS}$ may be the same value for neighboring cells or cells of a specific channel estimation set. Alternatively or additionally, $I_{CSI-RS}$ may be different for the cells as long as the $I_{CSI-RS}$ values have the same remainder of dividing them by 5.

The BS(s) of the cells within the channel estimation set may determine or adjust $I_{CSI-RS}$ for the cells and transmit the determined or adjusted $I_{CSI-RS}$ to UEs within the cells. Each of the cells of the channel estimation set may perform CSI-RS transmission in CSI-RS subframes specified by $I_{CSI-RS}$. The UE may determine, from $I_{CSI-RS}$, CSI-RS subframes in which one or more CSI-RSs of a cell providing a communication service, (hereinafter referred to as serving cell), to the UE are transmitted. The UE may determine subframes satisfying the following equation as CSI-RS subframes.

$$(10n_f + \lfloor n_s/2 \rfloor - \Delta_{CSI-RS}) \bmod T_{CSI-RS} = 0 \quad \text{[Equation 1]}$$

In Equation 1, $n_f$ denotes a system frame number and $n_s$ denotes a slot number within a radio frame.

For example, a BS of a cell A transmitting a CSI-RS as shown in FIG. 13 may transmit $I_{CSI-RS}$, which is set to 0, to a UE located in the cell A. The UE located in the cell A may determine from $I_{CSI-RS}=0$ that it should receive the CSI-RS in every 5 subframes starting from subframe 0.

As another example, CSI-RS subframes may be specified by a radio frame number $n_f$ indicating a start radio frame configured for the first CSI-RS transmission, a subframe index n indicating a subframe in which a CSI-RS is transmitted in the start radio frame, and a CSI-RS transmission interval t. For instance, if the BS transmits ($n_f$, n, t), the UE may determine a start subframe in which a CSI-RS is first transmitted and determine that a CSI-RS is transmitted in every t subframes beginning from the start subframe.

Meanwhile, in order for the UE to more accurately measure a channel state of a specific cell (or a specific antenna group transmission port), cells adjacent to the specific cell may transmit a null signal on a subcarrier within an OFDM symbol, i.e., an RE in which a CSI-RS of the specific cell is transmitted. This is called RE muting. If a prescribed RE of a prescribed cell is muted, since a DL signal of the prescribed cell is not transmitted on the prescribed RE to the UE, the prescribed cell does not affect channel measurement and/or interference measurement performed by the UE on the prescribed RE. That is, a signal transmitted through the prescribed cell may be excluded from a process of channel measurement and/or interference measurement.

To prevent collision between CSI-RSs transmitted from neighboring cells and CSI-RS dropping caused by RE muting, CSI-RSs of the neighboring cells should not be carried at the same positions. Accordingly, resources to which the CSI-RSs of the neighboring cells are allocated are preferably orthogonal. This CSI-RS orthogonality may be achieved by defining CSI-RS patterns so that the CSI-RSs of the neighboring cells do not overlap in a predetermined time/frequency resource area. Hereinafter, positions of resources within an RB pair in which CSI-RS ports configured by a BS transmit corresponding CSI-RSs are referred to as a CSI-RS pattern. A CSI-RS pattern is also called a CSI-RS configuration.

Figure 14:
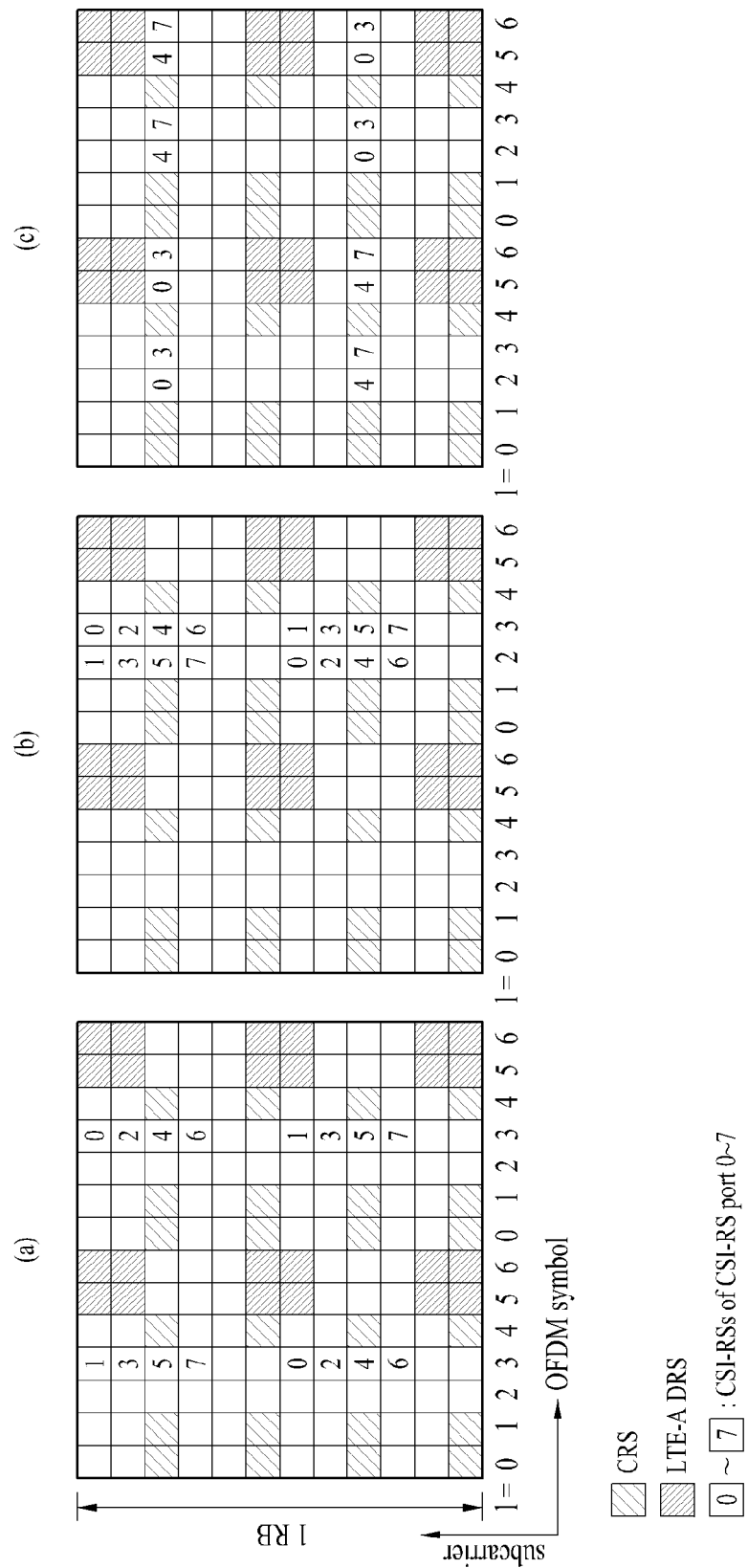
FIGS. 14 to 16 illustrate exemplary CSI-RS patterns.
Figure 15:
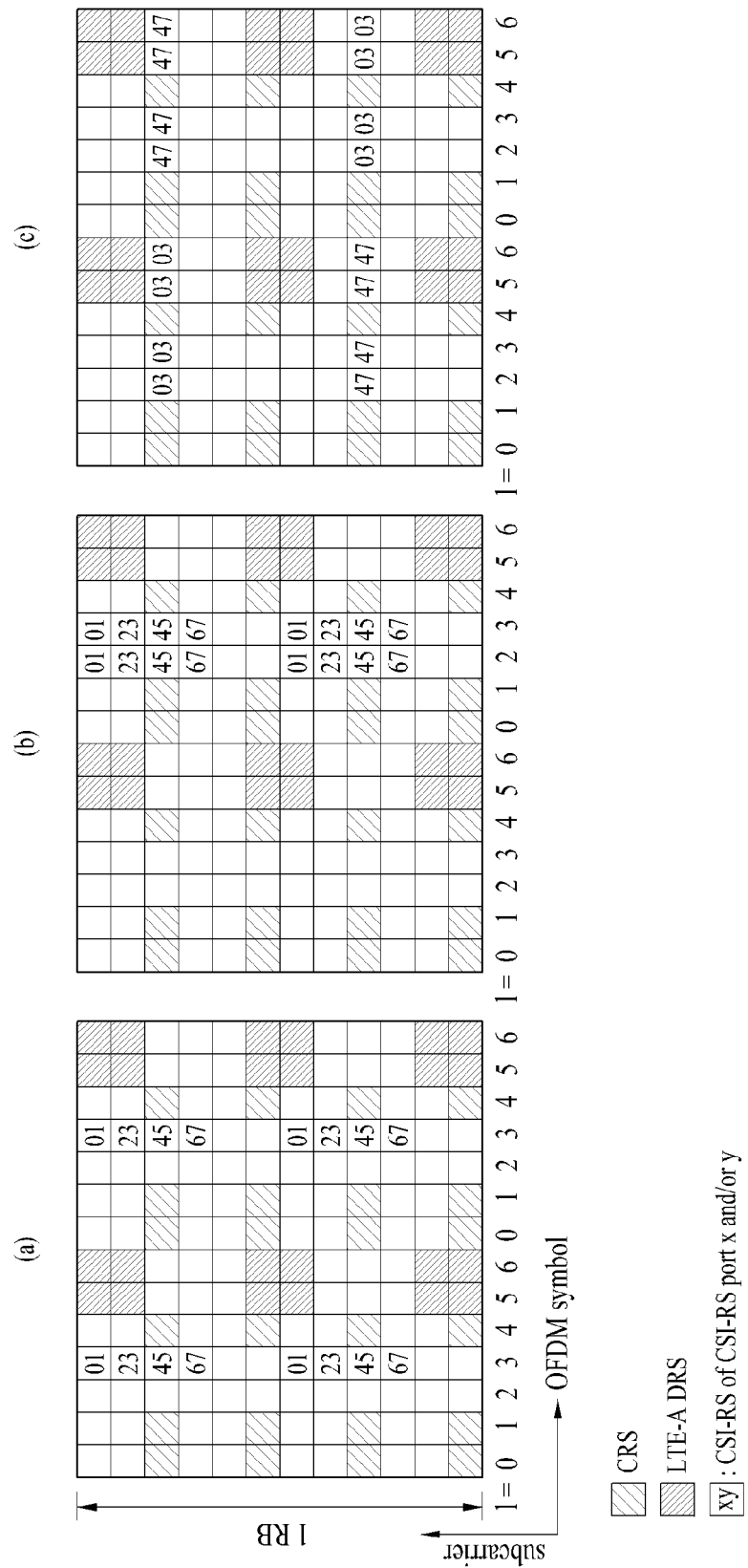
Figure 16:
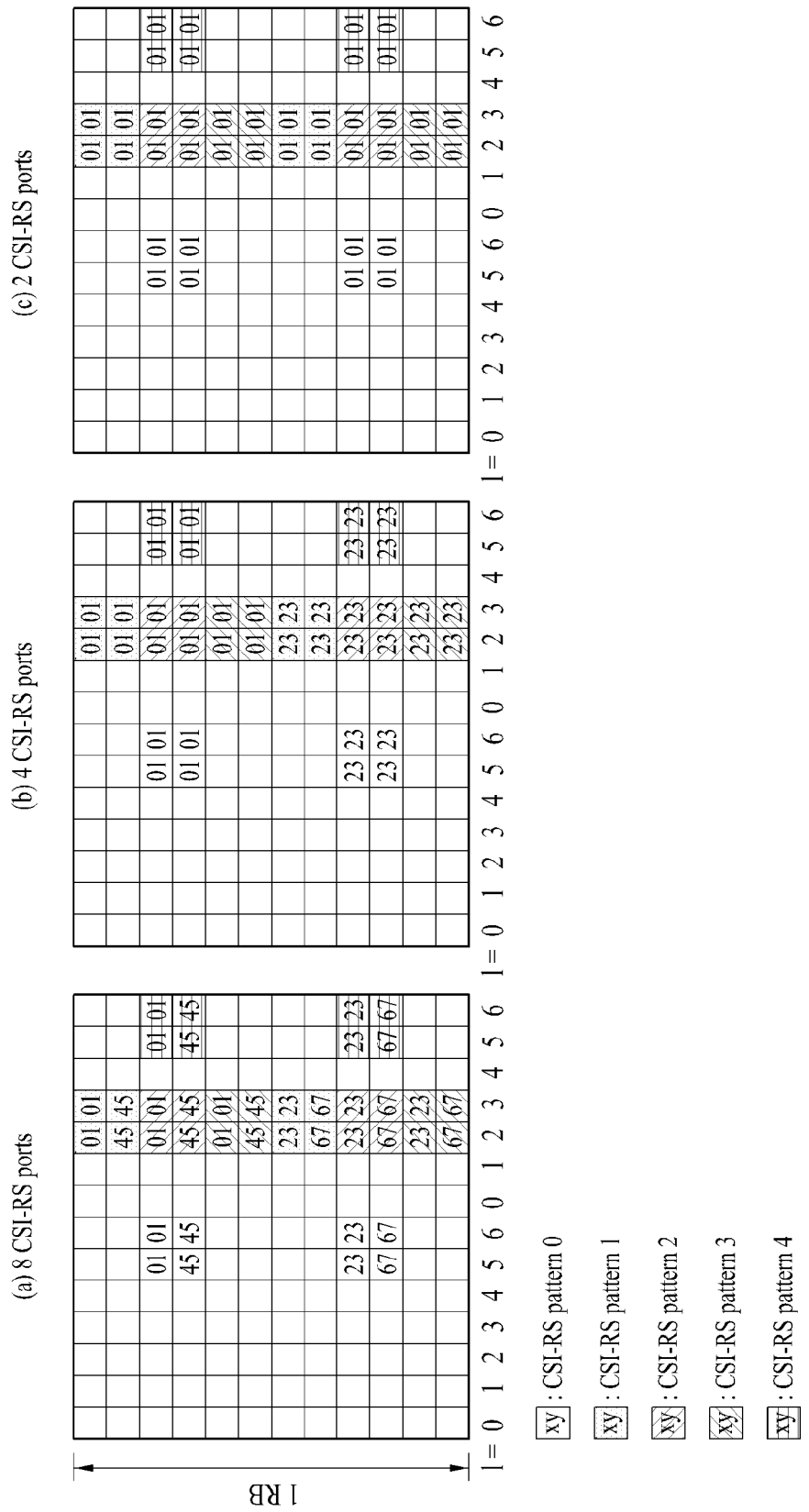

FIGS. 14 to 16 illustrate exemplary CSI-RS patterns. For convenience of description, it is assumed that a BS may configure a maximum of 8 CSI-RS ports. In a description of embodiments of the present invention, a CSI-RS that a CSI-RS port x transmits will be referred to as a CSI-RS x.

According to the exemplary CSI-RS patterns of FIG. 14, only one CSI-RS port transmits a CSI-RS on a time-frequency resource. Referring to FIG. 14(a), a BS configures a maximum of 8 CSI-RS ports each transmitting a corresponding CSI-RS on a corresponding CSI-RS RE. For example, a CSI-RS port 1 transmits a CSI-RS 1 on the 12th subcarrier within an OFDM symbol 3 in the first RB of a RB pair of a CSI-RS subframe (i.e. in an RB belonging to the first slot of the CSI-RS subframe) and transmits the CSI-RS 1 on the 6th subcarrier within an OFDM symbol 3 in the second RB (i.e. in an RB belonging to the second slot of the CSI-RS subframe). A CSI-RS port 0 transmits a CSI-RS 0 on the 6th subcarrier within the OFDM symbol 3 in the first RB and transmits the CSI-RS 0 on the 12th subcarrier within the OFDM symbol 3 in the second RB.

Unlike the pattern of FIG. 14 in which only one CSI-RS is transmitted on a time-frequency resource, in the CSI-RS patterns of FIG. 15, a plurality of CSI-RSs are multiplexed and transmitted on a time-frequency resource. Code Division Multiplexing (CDM) may be used to distinguish between CSI-RSs multiplexed on the same resource. For example, a BS may spread a CSI-RS x and a CSI-RS y using an orthogonal sequence having a length of 2 and transmit both of the CSI-RS x and CSI-RS y on 2 REs.

In FIG. 15, 'xy' denotes CSI-RSs transmitted on a corresponding resource. For example, a resource indicated by '01' means that a CSI-RS 0 and a CSI-RS 1 are multiplexed and transmitted on the resource indicated by '01'. Referring to FIG. 15(a), a CSI-RS port 1 transmits a CSI-RS 1 through the 6th and 12th subcarriers in an ODFM symbol 3 of the first RB within a RB pair and through the 6th and 12th subcarriers in an OFDM symbol 3 of the second RB within the RB pair. A CSI-RS port 0 transmits a CSI-RS 0 through the 6th and 12th subcarriers in the ODFM symbol 3 of the first RB and through the 6th and 12th subcarriers in the OFDM symbol 3 of the second RB. That is, the CSI-RS 0 and the CSI-RS 1 are multiplexed and transmitted on the 6th subcarrier in the OFDM symbol 3 of each RB and on the 12th subcarrier in the OFDM symbol 3 of each RB.

The CSI-RS patterns shown in FIGS. 14 and 15 are exemplary and other CSI-RS patterns may be defined. Table 2 and Table 3 shows examples of CSI-RS patterns which can be used in FS-1 and FS-2. Table 2 shows CSI-RS patterns in a subframe with a normal CP and Table 3 shows CSI-RS patterns in a subframe with an extended CP.

TABLE 2

| | CSI-RS pattern | Number of CSI-RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS-2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |

TABLE 2-continued

| CSI-RS pattern | Number of CSI-RSs configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 3

| | CSI-RS pattern | Number of CSI-RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS-1 and FS-2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS-2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

When applying (k',l') and $n_s$ shown in Table 2 or Table 3 to the following equation, an RE used for transmission of a corresponding CSI-RS by each CSI-RS port can be determined That is, in a CSI-RS subframe, a CSI-RS sequence may be mapped to complex-valued modulation symbols $a^{(p)}_{k,l}$ which are used as reference symbols on a CRS-RS port p according to the following equation.

$$a^{(p)}_{k,l} = w_{l''} \cdot r_{l,n_s}(m') \qquad \text{[Equation 2]}$$

In Equation 2, a resource index pair (k,l) used by a CSI-RS port p for CSI-RS transmission may be determined by the following equation.

$$k = k' + 12m + \begin{cases} -0 \text{ for } p \in \{0, 1\}, \\ \quad \text{normal cyclic prefix} \\ -6 \text{ for } p \in \{2, 3\}, \\ \quad \text{normal cyclic prefix} \\ -1 \text{ for } p \in \{4, 5\}, \\ \quad \text{normal cyclic prefix} \\ -7 \text{ for } p \in \{6, 7\}, \\ \quad \text{normal cyclic prefix} \\ -0 \text{ for } p \in \{0, 1\}, \\ \quad \text{extended cyclic prefix} \\ -3 \text{ for } p \in \{2, 3\}, \\ \quad \text{extended cyclic prefix} \\ -6 \text{ for } p \in \{4, 5\}, \\ \quad \text{extended cyclic prefix} \\ -9 \text{ for } p \in \{6, 7\}, \\ \quad \text{extended cyclic prefix} \end{cases}$$ [Equation 3]

$$l = l' + \begin{cases} l'' & \text{CSI reference signal configurations } 0-19, \\ & \quad \text{normal cyclic prefix} \\ 2l'' & \text{CSI reference signal configurations } 20-31, \\ & \quad \text{normal cyclic prefix} \\ l'' & \text{CSI reference signal configurations } 0-27, \\ & \quad \text{extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

FIG. 16 shows CSI-RS patterns according to Equation 3 and Table 2. Especially, FIG. 16(a) shows 5 CSI-RS patterns for 8 CSI-RS ports, FIG. 16(b) shows CSI-RS pattern 0 to CSI-RS pattern 5 among 16 CSI-RS patterns of Table 2 for 4 CSI-RS ports, and FIG. 16(c) shows CSI-RS pattern 0 to CSI-RS pattern 5 among 32 CSI-RS patterns of Table 2 for one or two CSI-RS ports.

The CSI-RS patterns of Table 2 and Table 3 have a nested property. The nested property means that a CSI-RS pattern for a large number of CSI-RS ports is a superset of a CSI-RS pattern for a small number of CSI-RS ports. Referring to FIGS. 16(a) and 16(b), for example, REs constituting a CSI-RS pattern 0 for 4 CSI-RS ports are identical to REs constituting a CSI-RS pattern 0 for 8 CSI-RS ports. However, among the REs constituting the CSI-RS pattern 0 for the 8 CSI-RS ports, the REs used for CSI-RS transmission of a CSI-RS port 4 and a CSI-RS port 5 are used for CSI-RS transmission of a CSI-RS port 0 and a CSI-RS port 1 in the CSI-RS pattern 0 for the 4 CSI-RS ports. Further, among the REs constituting the CSI-RS pattern 0 for the 8 CSI-RS ports, the REs used for CSI-RS transmission of a CSI-RS port 6 and a CSI-RS port 7 are used for CSI-RS transmission of a CSI-RS port 2 and a CSI-RS port 3 in the CSI-RS pattern 0 for the 4 CSI-RS ports.

A BS may configure a CSI-RS pattern for a specific cell and transmit information indicating the configured CSI-RS pattern to a UE located in the specific cell. Referring to Table 2 in case of the normal CP, indexes of a CSI-RS pattern applied commonly to FS-1 and FS-2 are 0 to 19 and indexes of a CSI-RS pattern applied only to FS-2 are 20 to 31. Referring to Table 3 in case of the extended CP, indexes of a CSI-RS pattern applied commonly to FS-1 and FS-2 are 0 to 15 and indexes of a CSI-RS pattern applied only to FS-2 are 16 to 27. Accordingly, the BS may transmit 5-bit CSI-RS pattern index information to the UE. Meanwhile, since a CSI-RS pattern varies according to the number of CSI-RS ports, the BS may further transmit information indicting the number of CSI-RS ports. Referring to Table 2 or Table 3, the BS may configure 1, 2, 4, or 8 CSI-RS ports. Since there are 4 numbers indicating the number CSI-RS ports configured by the BS, the BS may transmit the information indicating the number of CSI-RS ports using 2 bits. For example, $(00)_2$, $(01)_2$, $(10)_2$, and $(11)_2$ may be predefined in the BS and the UE to indicate one CSI-RS port, two CSI-RS ports, four CSI-RS ports, and eight CSI-RS ports, respectively.

The BS processor 400*b* according to the embodiments of the present invention may configure CSI-RS subframe(s) and a CSI-RS pattern. The BS processor 400*b* may generate information indicating the configured CSI-RS subframe(s), that is, CSI-RS subframe configuration information. The BS processor 400*b* may generate information indicating a CSI-RS transmission interval and information indicating a subframe offset, or $I_{CSI-RS}$, as the CSI-RS subframe configuration information. The BS processor 400*b* may control the BS transmitter 100*b* to transmit the CSI-RS subframe configuration information. The BS processor 400*b* may generate information indicating the configured CSI-RS pattern, that is, CSI-RS pattern information. The BS processor 400*b* may generate a CSI-RS pattern index corresponding to the configured CSI-RS pattern as the CSI-RS pattern information. The BS processor 400*b* may control the BS transmitter 100*b* to transmit the CSI-RS pattern information. The BS processor 400*b* may further generate information indicating the number of antenna ports for CSI-RS transmission, that is, information indicating the number of CSI-RS ports as the CSI-RS pattern information and may control the BS transmitter 100*b* to transmit the information indicating the number of CSI-RS ports to the UE. The BS processor 400*b* controls the BS transmitter 100*b* to transmit CSI-RSs according to the CSI-RS pattern in the CSI-RS subframe. In this case, each CSI-RS port of the BS transmits a CSI-RS in a CSI-RS RE for the CSI-RS port within the CSI-RS pattern.

One or more CSI-RS patterns may be configured for a given cell. A BS of a serving cell, (hereinafter referred to as a serving BS), may configure one or more CSI-RS ports for channel measurement of the serving cell and transmit one or more CSI-RSs through one or more CSI-RS ports according to one CSI-RS pattern. Referring to FIG. 16(a) for example, the serving BS may configure 8 CSI-RS ports and transmit 8 CSI-RS sequences according to the CSI-RS pattern 0 through the 8 CSI-RS ports to a UE located in the serving cell.

Meanwhile, if there is a neighboring cell which is greatly affected by the serving cell or greatly affects the serving cell, the serving BS may mute a DL signal on REs belonging to a CSI-RS pattern used by the neighboring cell for CSI-RS transmission. For example, referring to FIG. 16(a), if there are neighboring cells using the CSI-RS patterns 1, 2, 3, and 4 for CSI-RS transmission, CSI-RS ports of the serving BS may transmit CSI-RSs on REs belonging to the CSI-RS pattern 0 and may not transmit a signal on REs belonging to the CSI-RS patterns 1, 2, 3, and 4. The serving BS may transmit information indicating a CSI-RS pattern in which a signal of the serving cell is muted to the UE. However, if the serving cell slightly affects a neighboring cell or the neighboring cell slightly affects the serving cell, the CSI-RS pattern for RE muting may not be configured.

A muting interval (or a muting period) at which one or more CSI-RS patterns for RE muting (hereinafter, an RE muting pattern) are configured and a subframe offset indicating a subframe including muted REs may be equal to or different from the CSI-RS interval $T_{CSI-RS}$ and the subframe offset $\Delta_{CSI-RS}$ for CSI-RS transmission. For example, referring to Table 1, the BS may separately configure and transmit to a UE $I_{CSI-RS}$ indicating CSI-RS subframe(s) configured for CSI-RS transmission of the serving cell and $I_{CSI-RS}$ indicating a subframe configured for RE muting.

The BS processor 400b according to the embodiments of the present invention may configure subframe(s) for RE muting and an RE muting pattern. The BS processor 400b may generate information indicating the configured muting subframe, that is, muting subframe configuration information. The BS processor 400b may generate an RE muting interval and a subframe offset for RE muting, or $I_{CSI-RS}$ for RE muting, as the muting subframe configuration information. The BS processor 400b may control the BS transmitter 100b to transmit the muting subframe configuration information. The BS processor 400b may generate information indicating the configured muting pattern, that is, muting pattern information. The BS processor 400b may generate a muting pattern index corresponding to the configured muting pattern as the muting pattern information. The BS processor 400b may control the BS transmitter 100b to transmit the muting pattern information. The BS processor 400b may control the BS transmitter 100b to mute REs belonging to the muting pattern in the muting subframe. In other words, the BS processor 400b may control the BS transmitter 100b so that a transmission power on REs belonging to the muting pattern within the muting subframe becomes 0. In this case, each transmission antenna 500b of the BS transmits signals at a zero transmission power, on REs belonging to the muting pattern within the muting subframe.

<CSI-RS Transmission Vs. PSS/PBCH/SSS Transmission>

A CSI-RS port of a prescribed cell transmits a corresponding CSI-RS over an entire DL frequency band in a CSI-RS subframe configured for CSI-RS transmission of a cell. Namely, the CSI-RS port of the cell transmits the CSI-RS in $N^{DL}_{RB}$ RBs spanning an entire DL system bandwidth.

If a subframe configured for CSI-RS transmission differs from a subframe configured for PSS/SSS/PBCH transmission, the BS may transmit configured CSI-RSs to the UE without affecting PSS/SSS/PBCH transmission. The UE may receive PSS/SSS/PBCH and the CSI-RSs in different subframes without influence therebetween. However, a subframe configured for CSI-RS transmission may collide with a subframe in which a synchronization signal or a broadcast signal is transmitted depending on a CSI-RS transmission interval and a subframe offset. For example, when the PSS/SSS/PBCH is transmitted as shown in FIG. 5, the PBCH is transmitted in subframe 0 in every radio frame and the PSS and SSS are transmitted in subframe 0 and subframe 5 in every radio frame. In addition, when one or more CSI-RSs is/are transmitted as shown in FIG. 13, the one or more CSI-RS is/are transmitted in subframe 0 and subframe 5 in every radio frame. That is, when the PBCH, PSS, and SSS are transmitted as shown in FIG. 5 and when the one or more CSI-RS is/are transmitted as shown in FIG. 13, the PBCH and/or PSS/SSS are transmitted in subframes configured for CSI-RS transmission. In this case, a CSI-RS RE may collide with a PBCH/PSS/SSS RE depending on a CSI-RS pattern.

1. Embodiment 1: Non-transmission of CSI-RS in PSS/SSS/PBCH Subframe

If a subframe for PSS, SSS, or PBCH transmission collides with a subframe for CRS-RS transmission, a BS may not transmit CSI-RSs in the colliding subframe. If CSI-RS transmission in a subframe configured for CSI-RS transmission collides with synchronization signal or broadcast signal transmission, the BS processor 400b configured according to Embodiment 1 of the present invention may not control the BS transmitter 100b to transmit CSI-RSs in that subframe. Namely, according to Embodiment 1, no CSI-RSs are transmitted in a subframe in which PSS/SSS/PBCH are transmitted (i.e., in a colliding CSI-RS subframe) among CSI-RS subframes. However, if a subframe configured for CSI-RS transmission differs from a subframe in which the PSS/SSS/PBCH are transmitted, the BS processor 400b controls the BS transmitter 100b to perform CSI-RS transmission in the CSI-RS subframe as long as there is no other reason. Namely, as long as there is no other reason, each CSI-RS port transmits a corresponding CSI-RS in a CSI-RS subframe.

The BS may transmit data signals, instead of CSI-RSs, on REs except for PSS/SSS/PBCH REs among CSI-RS REs within the colliding CSI-RS subframe. To transmit the data signals, the BS processor 400b may allocate the data signals to REs which do not collide with REs for PSS/SSS/PBCH transmission among the REs for CSI-RS transmission within the colliding CSI-RS subframe. The BS transmitter 100b transmits the data signals through CSI-RS REs which do not collide with the PSS/SSS/PBCH REs in the colliding CSI-RS subframe under the control of the BS processor 400b. In this case, a UE may receive or detect CSI-RS(s) of a cell in a subframe which is not used for PSS/SSS/PBCH transmission among CSI-RS subframes and measure a channel of the cell using the CSI-RS(s).

The UE processor 400a configured according to Embodiment 1 of the present invention may determine whether a CSI-RS subframe collides with a PSS/SSS/PBCH subframe using CSI-RS subframe configuration information (e.g. $I_{CSI-RS}$) received from the BS. The UE processor 400a controls the UE receiver 300a to receive or detect CSI-RS(s) in the CSI-RS subframe which does not coincide with the PSS/SSS/PBCH subframe. The UE processor 400a may control the UE receiver 300a to perform (or derive) channel measurement based on the received CSI-RS(s). The UE processor 400a may control the UE transmitter 100a to generate CSI based on a result of channel measurement and to transmit the generated CSI to the BS. However, the UE processor 400a assumes that no CSI-RS is transmitted in the CSI-RS subframe which collides with the PSS/SSS/PBCH subframe. Accordingly, the UE processor 400a does not control the UE receiver 300a to receive or detect a CSI-RS in the colliding CSI-RS subframe. Thus, the UE receiver 300a does not perform channel measurement in the colliding CSI-RS subframe.

Generally, in order to accurately demodulate reception data, a receiver performs rate matching to collect only actual data REs among REs in a data region. If CSI-RS(s) is/are configured, CSI-RS REs among REs in a corresponding subframe are regarded as non-data REs in a rate matching process. If the BS transmits a CSI-RS according to Embodiment 1, the UE demodulates data under the assumption that no CSI-RS is transmitted in a subframe in which the PSS/SSS/PBCH is transmitted among CSI-RS subframes. In other words, the UE demodulates data by regarding REs except for PSS/SSS/PBCH REs among CSI-RS REs in a colliding subframe as data REs rather than RS REs. The UE processor 400a is configured to perform rate matching for excluding CSI-RSs from data in a CSI-RS subframe. If the CSI-RS subframe is identical to a PSS/SSS/PBCH subframe, the UE processor 400*a* may determine that any CSI-RS is not transmitted in the CSI-RS subframe and may not perform rate matching caused by CSI-RSs.

Meanwhile, according to Embodiment 1, upon receiving the CSI-RS subframe configuration information $I_{CSI-RS}$, the UE may determine subframes satisfying the following equation among 8 subframes except for subframe 0 and subframe 5 to be CSI-RS subframes.

$$(8n_f + \lfloor n_s/2 \rfloor - \Delta_{CSI-RS}) \bmod T_{CSI-RS} = 0 \quad \text{[Equation 4]}$$

According to Embodiment 1, in some cases, a CSI-RS may not be transmitted at all. For example, if the PSS/SSS/PBCH is transmitted as shown in FIG. 5 and if CSI-RS(s) is/are transmitted as shown in FIG. 13, since at least one of the PSS, SSS, and PBCH is transmitted in all CSI-RS subframes, there is no subframe in which a CSI-RS is actually transmitted according to Embodiment 1. Hence, when CSI-RSs are transmitted according to Embodiment 1, the BS has to configure a CSI-RS transmission interval and a subframe offset such that a CSI-RS subframe which does not overlap with a PSS/SSS/PBCH subframe is present.

2. Embodiment 2: Non-transmission of CSI-RSs in RBs Including PSS/SSS/PBCH

When a subframe for PSS, SSS, or PBCH transmission collides with a subframe for CSI-RS transmission, a BS may not transmit CSI-RSs in RBs carrying PSS/SSS/PBCH among RBs in the colliding subframe. The BS may not transmit any CSI-RS in 6 RBs adjacent to a DC subcarrier in the colliding subframe. The BS processor 400*b* configured according to Embodiment 2 may control the BS transmitter 100*b*, when a CSI-RS subframe is identical to a PSS/SSS/PBCH subframe, to perform CSI-RS transmission in an RB not carrying PSS/SSS/PBCH in a CSI-RS subframe and not to perform CSI-RS transmission in an RB not carrying PSS/SSS/PBCH in the CSI-RS subframe.

The BS may transmit data signals instead of CSI-RSs on REs except for PSS/SSS/PBCH REs among CSI-RS REs in 6 RBs including the PSS/SSS/PBCH in a colliding subframe. If a CSI-RS RE configured for CSI-RS transmission is present in an RB including PSS/SSS/PBCH, the BS processor 400*b* may allocate a data signal on a CSI-RS RE which is not a PSS/SSS/PBCH RE in the RB. The BS transmitter 400*b* may control the BS transmitter 100*b* to transmit the PSS/SSS/PBCH on a CSI-RS RE which is identical to a PSS/SSS/PBCH RE in the RB and to transmit a data signal on a CSI-RS RE which is not a PSS/SSS/PBCH RE in the RB.

The UE may receive or detect CSI-RS(s) of a cell in a CSI-RS subframe and measure a channel of the cell using the CSI-RS(s). However, the UE according to Embodiment 2 of the present invention may not receive or detect any CSI-RS over a frequency band corresponding to 6 RBs including the PSS/SSS/PBCH among frequency bands in a colliding subframe. That is, the UE according to Embodiment 2 of the present invention may not measure a channel in an RB including the PSS/SSS/PBCH. Moreover, the UE may demodulate data under the assumption that a CSI-RS is not transmitted in an RB including the PSS/SSS/PBCH in a subframe in which the PSS/SSS/PBCH are transmitted among CSI-RS subframes.

The UE processor 400*a* configured according to Embodiment 2 of the present invention may determine whether a CSI-RS subframe collides with a PSS/SSS/PBCH subframe based on CSI-RS subframe configuration information (e.g. $I_{CSI-RS}$) received from the BS. The UE processor 400*a* controls the UE receiver 300*a* to receive or detect CSI-RS(s) in a CSI-RS subframe which does not coincide with a PSS/SSS/PBCH subframe. The UE processor 400*a* controls the UE receiver 300*a*, when a CRS-RS subframe is identical to a PSS/SSS/PBCH subframe, to receive or detect CSI-RS(s) in RBs which do not include the PSS/SSS/PBCH in the CSI-RS subframe. The UE processor 400*a* determines or assumes that CSI-RS(s) for a cell is/are not transmitted in an RB including the PSS/SSS/PBCH in a colliding CSI-RS subframe and may not control the UE receiver 300*a* to receive or detect a CSI-RS in the colliding CSI-RS subframe.

The UE processor 400*a* may control the UE receiver 300*a* to perform channel measurement using CSI-RS(s) in a CSI-RS subframe in which PSS/SSS/PBCH are not transmitted, and in RBs which do not include PSS/SSS/PBCH in a CSI-RS subframe in which PSS/SSS/PBCH is transmitted. The UE processor 400*a* may control the UE transmitter 100*a* to generate CSI based on a result of channel measurement and to transmit the generated CSI to the BS. However, the UE processor 400*a* assumes that no CSI-RS is transmitted in an RB including the PSS/SSS/PBCH in a CSI-RS subframe which collides with a PSS/SSS/PBCH subframe. Accordingly, the UE processor 400*a* may not control the UE receiver 300*a* to receive or detect a CSI-RS in an RB including PSS/SSS/PBCH in the colliding CSI-RS subframe. Thus, the UE receiver 300*a* does not perform channel measurement in an RB including PSS/SSS/PBCH in the CSI-RS subframe.

The UE may determines subframes satisfying Equation 1 as CSI-RS subframes. However, the UE assumes that CSI-RSs are not transmitted in 6 RBs including PSS/SSS/PBCH in a CSI-RS subframe.

3. Embodiment 3: Non-transmission of CSI-RSs in Subframes Including CSI-RS REs Colliding with PSS/SSS/PBCH REs According to Embodiment 1 and Embodiment 2, no CSI-RS is transmitted over an entire frequency band of a CSI-RS subframe colliding with a PSS/SSS/PBCH subframe or a frequency band corresponding to 6 RBs carrying PSS/SSS/PBCH in the CSI-RS subframe, irrespective of a CSI-RS pattern. However, even if a CSI-RS subframe collides with a PSS/SSS/PBCH subframe, CSI-RS REs may not collide with PSS/SSS/PBCH REs.

Figure 17:
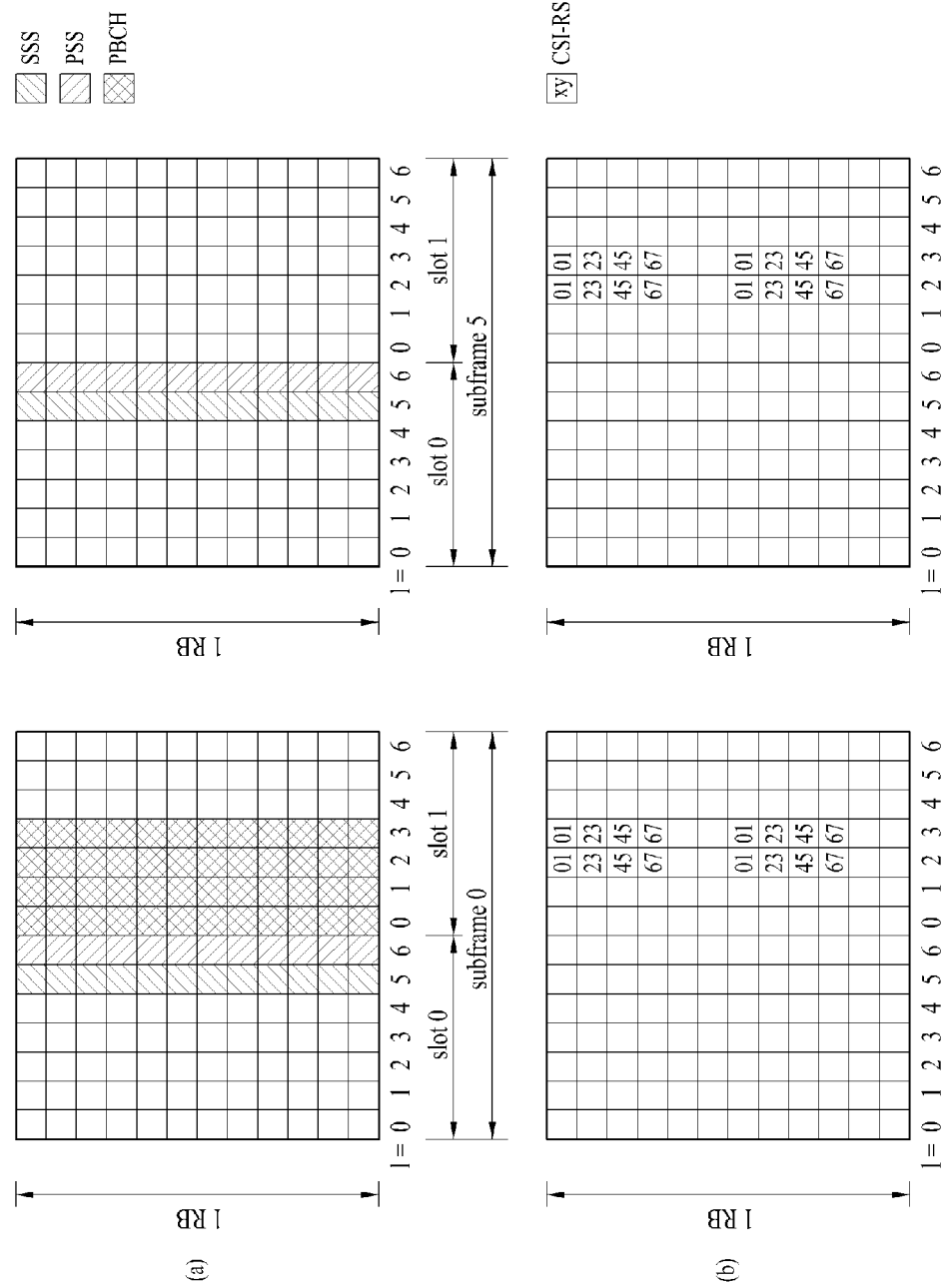
FIG. 17 illustrates exemplary RB pairs in which CSI-RSs are transmitted and exemplary RB pairs in which PSS/SSS/PBCH are transmitted.

FIG. 17 illustrates exemplary RB pairs in which CSI-RSs are transmitted and exemplary RB pairs in which PSS/SSS/PBCH are transmitted. In particular, FIG. 17(*a*) illustrates RB pairs including PSS/SSS/PBCH in a frame structure with a normal CP in FDD mode, and FIG. 17(*b*) illustrates RB pairs including the CSI-RS pattern of FIG. 15(*b*). It is assumed in FIG. 17 that CSI-RSs are transmitted in a form shown in FIG. 13.

Referring to FIG. 17, a BS operating in FDD mode transmits a PBCH, PSS, and SSS through 6 RBs adjacent to a DC subcarrier in subframe 0 with a normal CP. The BS also transmits the PSS and SSS through 6 RBs adjacent to the DC carrier in subframe 5. The BS may configure 8 CSI-RS ports for channel measurement of a cell and configure CSI-RS patterns of FIG. 17(*b*) in subframe 0 and subframe 5 for CSI-RS transmission by the 8 CSI-RS ports. In case of subframe 0, there are CSI-RS REs colliding with REs for PBCH transmission in the 6 RBs adjacent to the DC subcarrier. However, in case of subframe 5 in which the PSS and SSS are transmitted, REs for PSS and SSS transmission do not overlap with REs for CSI-RS transmission. There is no CSI-RS RE colliding with PSS/SSS/PBCH RE(s). According to the foregoing first embodiment, CSI-RSs are not transmitted in both subframe 0 and subframe 5. According to the foregoing second embodiment, CSI-RSs are transmitted over all frequency bands in subframe 5, whereas, in subframe 0, CSI-RSs are transmitted only over the other frequency bands except for a frequency band corresponding to the 6 RBs adjacent to the DC subcarrier. In Embodiment 3 of the present invention, however, the above-described first or second embodiment is applied only to a subframe in which a CSI-RS RE colliding with a PSS/SSS/PBCH RE is present.

Figure 18:
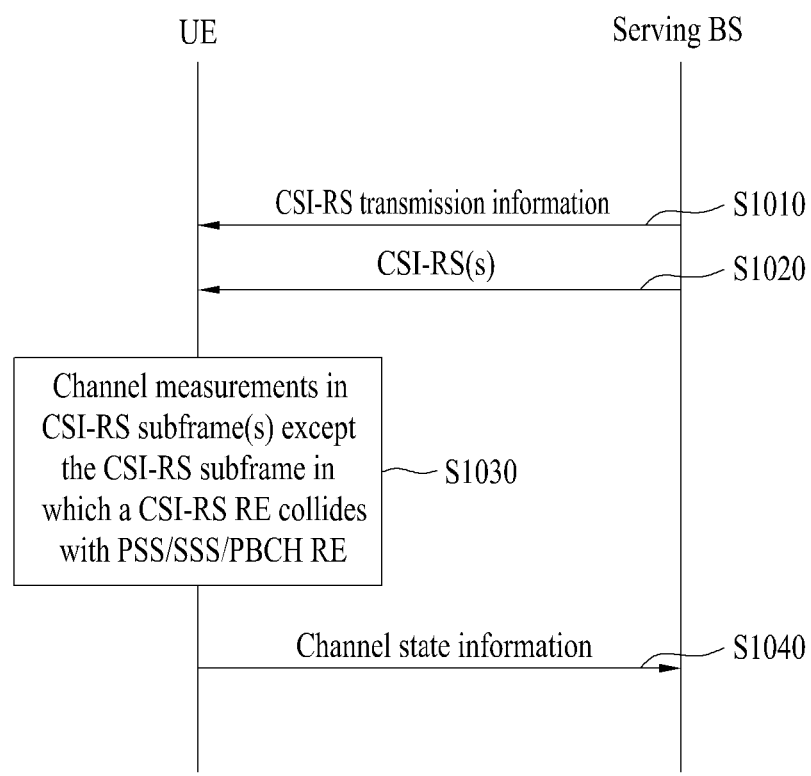
FIG. 18 illustrates a CSI-RS transmission flow according to Embodiment 3 of the present invention.

FIG. 18 illustrates a CSI-RS transmission flow according to Embodiment 3 of the present invention.

Since REs used for PBCH/PSS/SSS transmission are determined depending on whether a BS configures a subframe with a normal CP or a subframe with an extended CP and whether the BS operates in FDD mode or TDD mode, the BS and a UE connected to the BS are able to know PBCH/PSS/SSS REs. The BS may configure CSI-RS subframe(s) and CSI-RS pattern(s) and transmit CSI-RS transmission information indicating the CSI-RS subframe(s) and the CSI-RS pattern(s) to the UE in step S1010. For example, the BS may transmit information indicating a CSI-RS transmission interval and information indicating a subframe offset (or $I_{CSI-RS}$) and a CSI-RS pattern index to the UE as the CSI-RS transmission information. The BS may also transmit information indicating the number of CSI-RS ports as the CSI-RS transmission information. The BS may perform CSI-RS transmission according to the CSI-RS transmission information in step S1020. In CSI-RS transmission, the BS according to Embodiment 3 of the present invention applies Embodiment 1 and Embodiment 2 only to a subframe having a CSI-RS RE colliding with a PSS/SSS/PBCH RE.

(1) Embodiment 3-1

Embodiment 3 of the present invention applies Embodiment 1 of the present invention only to a CSI-RS subframe having a CSI-RS RE colliding with a PSS/SSS/PBCH RE, which will be referred as Embodiment 3-1. A BS according to Embodiment 3-1 does not transmit any CSI-RS in a CSI-RS subframe having a CSI-RS RE colliding with a PSS/SSS/PBCH RE and transmits CSI-RS(s) in a CSI-RS subframe having no CSI-RS RE colliding with a PSS/SSS/PBCH RE. The BS processor 400b configured according to Embodiment 3-1 controls the BS transmitter 100b not to transmit a CSI-RS in a CSI-RS subframe having a CSI-RS RE colliding with a PSS/SSS/PBCH REs. The BS processor 400b controls the BS transmitter 100b to transmit a CSI-RS, as long as there is no other reason, in a CSI-RS subframe in which a CSI-RS RE colliding with a PSS/SSS/PBCH RE is absent. That is, according to Embodiment 3-1 of the present invention, no CSI-RS is transmitted in a subframe in which transmission of a CSI-RS collides with transmission of a synchronization signal or a broadcast signal. In the case where a plurality of CSI-RSs is transmitted through a plurality of CSI-RS ports, even if only a CSI-RS RE for one CSI-RS port collides with a PSS/SSS/PBCH RE, all CSI-RS ports do not transmit CSI-RSs in a CSI-RS subframe in which the PSS/SSS/PBCH are transmitted.

Upon receiving CSI-RS transmission information transmitted by the BS, the UE may determine a CSI-RS subframe and determine which REs among REs in the CSI-RS subframe are to be used for CSI-RS transmission, based on the CSI-RS transmission information. In other words, the UE processor 400a may determine a CSI-RS subframe and CSI-RS REs in the CSI-RS subframe, based on the CSI-RS transmission information. The UE configured according to embodiment 3-1 of the present invention determines or assumes that CSI-RS(s) is/are not transmitted in a corresponding CSI-RS subframe when an RE colliding with a PSS/SSS/PBCH RE is present in the CSI-RS subframe. Accordingly, the UE processor 400a does not control the UE receiver 300a to perform (or derive) channel measurement in a CSI-RS subframe having a CSI-RS RE colliding with a PSS/SSS/PBCH RE. Alternatively, the UE processor 400a controls the UE receiver 300a not to perform (or derive) channel measurement in a CSI-RS subframe having a CSI-RS RE colliding with a PSS/SSS/PBCH RE. However, if no CSI-RS RE collides with a PSS/SSS/PBCH RE in a CSI-RS subframe, the UE receives or detects CSI-RS(s) transmitted through CSI-RS port(s) of a cell in CSI-RS subframes configured for CSI-RS transmission, and measures a channel of the cell using the CSI-RS(s) in step S1030. The UE processor 400a may control the UE receiver 300a to perform/derive channel measurement by receiving/detecting CSI-RS(s) in a CSI-RS subframe having no REs colliding with PSS/SSS/PBCH REs.

Referring to FIG. 17, the BS does not transmit CSI-RSs in subframe 0 but transmits CSI-RS(s) in subframe 5 according to the configured CSI-RS pattern. The UE does not receive CSI-RSs in subframe 0. Even if signals received in CSI-RS REs in subframe 0 are present, the UE does not perform channel measurement using the signals. However, since a CSI-RS RE colliding with a PSS/SSS/PBCH RE is absent in subframe 5, the UE may receive one or more CSI-RSs in subframe 5 and perform channel measurement using the one or more CSI-RSs. The UE may transmit CSI (e.g. PMI, CQI, RI, etc.) to the BS based on a result of channel measurement in step S1040.

According to Embodiment 3-1, in some cases, a CSI-RS may not be transmitted at all according to CSI-RS subframe configuration and a CSI-RS pattern. Therefore, according to Embodiment 3-1 of the present invention, the BS may configure a CSI-RS transmission interval and a subframe offset such that there is a CSI-RS subframe which does not overlap with a PSS/SSS/PBCH subframe or may configure a CSI-RS pattern such that there is no CSI-RS RE overlapping with a PSS/SSS/PBCH RE in a CSI-RS subframe.

(2) Embodiment 3-2

Embodiment 3 of the present invention applies Embodiment 2 of the present invention only to a CSI-RS subframe having a CSI-RS RE colliding with a PSS/SSS/PBCH RE, which will be referred as Embodiment 3-2. A BS according to Embodiment 3-2 does not transmit CSI-RS(s) through 6 RBs carrying PSS/SSS/PBCH in a CSI-RS subframe having a CSI-RS RE colliding with a PSS/SSS/PBCH RE. However, the BS transmits a CSI-RS in an RB including PSS/SSS/PBCH in a CSI-RS subframe having no CSI-RS RE colliding with a PSS/SSS/PBCH RE. That is, according to Embodiment 3-2 of the present invention, no CSI-RS is transmitted in an RB pair in which CSI-RS transmission collides with synchronization signal or broadcast signal transmission. When a plurality of CSI-RS ports are configured and a plurality of CSI-RSs are transmitted, even though only a CSI-RS RE for one CSI-RS port collides with a PSS/SSS/PBCH RE in a CSI-RS subframe, every CSI-RS ports do not transmit a CSI-RS in an RB including PSS/SSS/PBCH in the CSI-RS subframe.

The BS processor 400b configured according to Embodiment 3-2 controls the BS transmitter 100b to transmit a CSI-RS over an entire DL frequency band according a CSI-RS pattern in a CSI-RS subframe having no CSI-RS RE colliding with a PSS/SSS/PBCH RE. The BS processor 400b also controls the BS transmitter 100b to transmit a CSI-RS over the other DL frequency bands except for a frequency band corresponding to an RB including PSS/SSS/PBCH in a CSI-RS subframe having a CSI-RS RE colliding with a PSS/SSS/PBCH RE.

The UE may receive CSI-RS transmission information transmitted by the BS and determine a CSI-RS subframe and CSI-RS REs in the CSI-RS subframe, based on the CSI-RS transmission information. In other words, the UE processor 400a may determine a CSI-RS subframe and CSI-RS REs in the CSI-RS subframe, based on the CSI-RS transmission information. The UE configured according to Embodiment 3-2 determines or assumes that CSI-RS(s) is/are not transmitted in an RB including PSS/SSS/PBCH in a CSI-RS subframe when a CSI-RS RE collides with a PSS/SSS/PBCH RE in the CSI-RS subframe. Accordingly, the UE does not perform channel measurement in an RB having a CSI-RS RE colliding with a PSS/SSS/PBCH RE. However, if there is no RE colliding with a PSS/SSS/PBCH RE in a CSI-RS subframe, the UE may receive or detect CSI-RS(s) transmitted through CSI-RS port(s) over an entire frequency band of the CSI-RS subframe. The UE may derives channel measurement over the entire frequency band using the CSI-RS(s).

The UE processor 400a configured according to embodiment 3-2 determines or assumes that CSI-RS(s) is/are not transmitted in an RB including PSS/SSS/PBCH in a CSI-RS subframe when there is a CSI-RS RE colliding with a PSS/SSS/PBCH RE in the CSI-RS subframe. The UE processor 400a may not control the UE receiver 300a to perform (or derive) channel measurement in RB(s) having a CSI-RS RE colliding with a PSS/SSS/PBCH RE. Alternatively, the processor 400a may control the UE receiver 300a no to perform (or derive) channel measurement in RB(s) having a CSI-RS RE colliding with a PSS/SSS/PBC RE. However, if no CSI-RS collides with a PSS/SSS/PBCH RE in a CSI-RS subframe, the UE processor 400a controls the UE receiver 300a to receive or detect CSI-RS(s) transmitted through CSI-RS port(s) over an entire frequency band of the CSI-RS subframe. The UE processor 400a controls the UE receiver 300a to perform (or derive) channel measurement over the entire frequency band using the CSI-RS(s).

Referring to FIG. 17, the BS transmits CSI-RS(s) over the other DL frequency bands except for a frequency band corresponding to RBs including PSS/SSS/PBCH in subframe 0. Meanwhile, in subframe 5, the BS transmits CSI-RS(s) in all DL frequency bands. Even if there are signals received on CSI-RS REs in RBs including PSS/SSS/PBCH in subframe 0, the UE does not perform channel measurement using the signals. However, since CSI-RS REs colliding with PSS/SSS/PBCH REs are absent in subframe 5, the UE may receive CSI-RS(s) over all frequency bands in subframe 5 and perform channel measurement using the CSI-RS(s).

The BS of the present invention may transmit one or more CSI-RSs according to any one of Embodiment 1, Embodiment 2, Embodiment 3-1, and Embodiment 3-2 of the present invention. The UE of the present invention may receive one or more CSI-RSs and perform (or derive) channel measurement using the one or more CSI-RSs according to any of the Embodiment 1, Embodiment 2, Embodiment 3-1, and Embodiment 3-2 of the present invention. The UE may transmit CSI to the BS using a result of channel measurement (step S1040). The UE processor 400a configured according to any one of Embodiment 1, Embodiment 2, Embodiment 3-1, and Embodiment 3-2 of the present invention may generate CSI using a result of channel measurement. The UE processor 400a may control the UE transmitter 100a to transmit the generated CSI to the BS.

The above-described Embodiment 1, Embodiment 2, Embodiment 3-1, and Embodiment 3-2 may be also applied to a subframe in which transmission of a CSI-RS collides with transmission of an SIB1 message as well as a subframe in which transmission of a CSI-RS collides with transmission of a synchronization signal or a broadcast signal. The above-described Embodiment 1, Embodiment 2, Embodiment 3-1, and Embodiment 3-2 may also be applied to a subframe configured for transmission of paging message(s). For example, referring to Embodiment 3-1, CSI-RSs may not be transmitted in a subframe having CSI-RS REs colliding with REs conveying an SIB1 message.

<RE Muting Vs. PSS/PBCH/SSS Transmission>

When a CSI-RS pattern for RE muting is configured, the BS may mute DL signals on REs belonging to the CSI-RS pattern for RE muting in an entire frequency bandwidth in a CSI-RS subframe. If a CSI-RS subframe collides with a PSS/SSS/PBCH subframe, REs to be muted may collide with REs for PSS/SSS/PBCH transmission depending on a CSI-RS pattern for RE muting. As described previously, PSS, SSS and PBCH are essential signals used when the UE enters a cell. If the UE fails to enter the cell because of non-acquisition of PSS/SSS/PBCH, it cannot perform channel measurement and/or interference measurement.

Accordingly, in the RE muting embodiment of the present invention, RE muting is not applied in a specific subframe when there is/are RE(s) overlapping with REs for PSS, SSS, or PBCH transmission among REs belonging to a CSI-RS pattern in the specific subframe. In this case, the UE determines or assumes that a CSI-RS pattern for RE muting is not configured in the specific subframe. The UE regards REs which are not used for PSS/SSS/PBCH transmission among REs belonging to the CSI-RS pattern for RE muting in the specific subframe as data REs and demodulates reception data. However, even if a subframe for RE muting collides with a subframe in which PSS/SSS/PBCH are transmitted, RE muting is applied when there is no RE colliding with REs for PSS/SSS/PBCH transmission among REs belonging to the CSI-RS pattern for RE muting. In this case, the UE regards the muted REs as non-data REs and demodulates data received thereon.

The BS processor 400b configured according to the RE muting embodiment of the present invention may not apply RE muting in a specific subframe when there is/are RE(s) overlapping with REs for PSS, SSS or PBCH transmission among REs belonging to a CSI-RS pattern for RE muting in the specific frame. In this case, the UE processor 400a determines assumes that the CSI-RS pattern for RE muting is not configured in the specific subframe. The UE processor 400a may regard REs which are not used for PSS/SSS/PBCH transmission among REs belonging to the CSI-RS pattern for RE muting as data REs and demodulate data received thereon.

Figure 19:
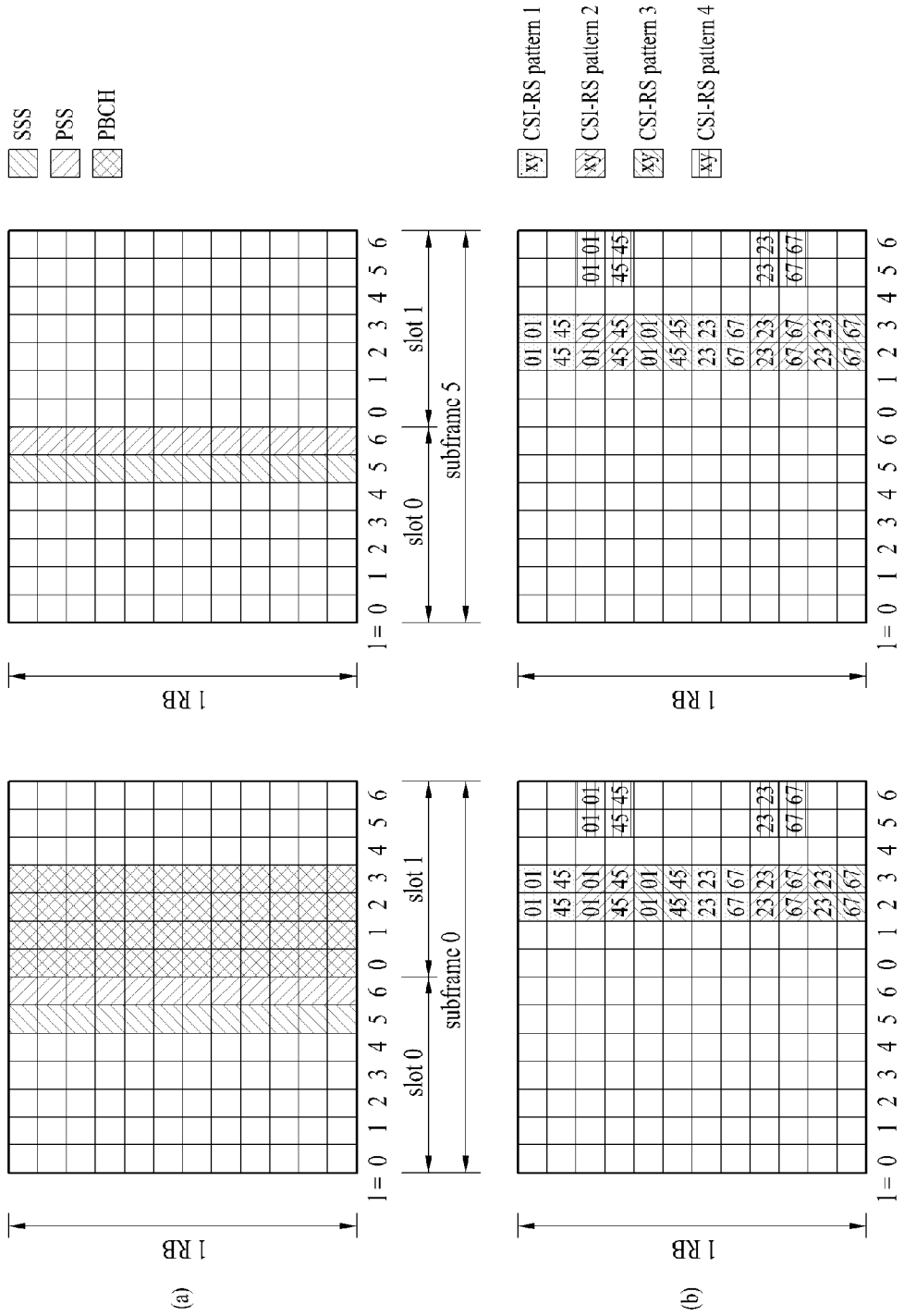
FIG. 19 illustrates exemplary RB pairs in which a CSI-RS pattern for RE muting is configured and exemplary RB pairs in which PBCH/PSS/SSS are transmitted.

FIG. 19 illustrates exemplary RB pairs in which a CSI-RS pattern for RE muting is configured and exemplary RB pairs in which PSS/SSS/PBCH are transmitted. In particular, FIG. 19(*a*) illustrates RB pairs including PSS/SSS/PBCH in a frame structure with a normal CP in FDD mode, and FIG. 19(*b*) illustrates the case where the CSI-RS patterns 1 to 4 are configured for RE muting among the CSI-RS patterns of FIG. 16(*a*). It is assumed in FIG. 19 that REs belonging to the CSI-RS patterns 1 to 4 are muted in subframe 0 and subframe 5.

Referring to FIG. 19, a BS of a cell operating in FDD mode transmits a PBCH, PSS, and SSS through RBs adjacent to a DC subcarrier in subframe 0 with a normal CP. The BS also transmits the PSS and SSS through 6 RBs adjacent to the DC carrier in subframe 5. The BS may configure the CSI-RS patterns 1 to 4 for RE muting in subframe 0 and subframe 5. In the case of subframe 0, REs belonging to CSI-RS patterns 1, 2, and 3 collide with REs for PBCH transmission in the 6 RBs adjacent to the DC subcarrier. However, in the case of subframe 5 in which the PSS and SSS are transmitted, no RE among REs belonging to the CSI-RS patterns 1, 2, 3, and 4 collides with REs for PSS and SSS transmission are absent. According to the RE muting embodiment of the present invention, the BS does not apply RE muting in subframe 0 but applies RE muting in subframe 5. The BS may transmit data signals instead of muting DL signals in a CSI-RS pattern for RE muting, (hereinafter referred to as RE muting pattern), in subframe 0. The BS provides RE muting information for RE muting to the UE. The RE muting information may include information indicating an RE muting pattern, an RE muting interval and a subframe offset (or $I_{CSI-RS}$ of the RE muting pattern). The UE assumes that transmission power is zero on REs belonging to the RE muting pattern in a subframe to which RE muting is applied.

The UE may determine a subframe in which an RE muting pattern is configured, (hereinafter referred to as RE muting subframe), and an RE muting pattern in the RE muting subframe, based on the RE muting information. The UE assumes that RE muting is not applied to the RE muting subframe when there are REs overlapping with PSS/SSS/PBCH REs among REs belonging to the RE muting pattern in the RE muting subframe. That is, the UE assumes that the BS transmits data signals in the RE muting pattern in the RE muting subframe.

The UE may measure a channel from a neighboring cell on muted REs or measure interference caused by the neighboring cell. According to the RE muting embodiment of the present invention, the UE may perform channel measurement or interference measurement in a subframe in which REs overlapping/colliding with PSS/SSS/PBCH REs are absent among REs belonging to the RE muting pattern. The UE may not perform channel measurement or interference measurement in a subframe in which REs overlapping/colliding with PSS/SSS/PBCH REs are present among REs belonging to the RE muting pattern.

The RE muting embodiment of the present invention may be applied to a subframe in which muted REs collide with REs conveying an SIB1 message, as well as to a subframe in which muted REs collide with synchronization signal REs or PBCH REs. The RE muting embodiment of the present invention may be also applied to a subframe configured to transmit a paging message.

The RE muting embodiment of the present invention may be used together with any one of the above-described Embodiment 1, Embodiment 2, Embodiment 3-1, and Embodiment 3-2.

<CSI Transmission>

A UE measures a channel of a serving cell or a neighboring cell or measures interference caused by the neighboring cell, according to one of the above-described embodiments and may feed back CSI of the serving cell and/or the neighboring cell based on a result the channel measurement or interference measurement to the BS (step S1040). Hereinafter, embodiments of the present invention for transmitting the CSI will be described.

1. Periodic Reporting Configuration

When using CSI-RSs as measurement RSs for channel measurement or interference measurement, a CSI reporting interval (also called a CSI reporting period) is desirably configured to correspond to a CSI-RS transmission interval $T_{CSI-RS}$. For example, if CSI is transmitted at regular intervals, a CSI transmission interval $T_{feedback}$ may be configured as follows.

$$T_{feedback} \alpha \cdot T_{CSI-RS} \quad \text{[Equation 5]}$$

In Equation 5, α is an integer.

A start subframe for CSI reporting may be configured with a specific offset. For example, the start subframe for CSI reporting may be configured to be associated with a CSI-RS subframe as indicated by the following equation.

$$N_{feedback} = N_{CSI-RS} + k \quad \text{[Equation 6]}$$

In Equation 6, $N_{feedback}$ denotes a start frame number, $N_{CSI-RS}$ denotes a start subframe in which CSI-RS(s) is/are transmitted, and k, which is a positive integer, may be determined by taking into account a processing time consumed to measure a channel using the CSI-RS(s). For instance, k may be 4. Referring to Equation 6, a UE receives CSI-RS(s) for the first time in a subframe having a subframe number of $N_{CSI-RS}$ and may start periodic transmission of CSI measured based on the CSI-RS(s) from a subframe having a subframe number of $(N_{CSI-RS}+k)$.

According to the present embodiment, the UE and the BS may predict a CSI reporting interval and a start subframe based on a CSI-RS, using values of a CSI-RS transmission interval and a CSI-RS start subframe.

2. Aperiodic Reporting Configuration

If a BS requests a UE to perform CSI reporting, the UE may perform aperiodic CSI reporting to transmit CSI after a specific number of subframes, for example, 4 subframes or 4 TTI. In case of aperiodic reporting, the UE configures CSI in a different form from periodic reporting and feeds back the CSI to the BS. For example, the UE aperiodically feeds back CSI to the BS using a PUSCH. The PUSCH includes more available resources than a PUCCH. Accordingly, when CSI reporting is performed through the PUSCH, the UE may configure CSI according to each subband and transmit the configured CSI to the BS. Namely, in case of aperiodic CSI reporting, the UE may configure a large amount of CSI through the PUSCH. Namely, the UE may use different measurement methods according to whether measurement is for periodic reporting or aperiodic reporting. In case of aperiodic reporting for example, the UE may measure channel state per subband with respect to all subbands contained in a DL frequency band and feed back CSI for each subband to the BS. Meanwhile, in periodic reporting, the UE may measure channel state under the assumption that data transmission is performed over an entire Dl frequency band or measure channels only in some subbands under the assumption that data transmission is performed in the some subbands within the DL frequency band. Accordingly, if the BS requests aperiodic reporting and the UE measures channels in all subbands, it may be difficult to feed back CSI to the BS immediately after a specific number of subframes.

The UE according to the aperiodic reporting embodiment of the present invention is configured to report CSI based on received CSI-RS(s) after i-TTI from a reception time point of CSI-RS(s) received after an aperiodic reporting request from the BS. Namely, according to the aperiodic reporting embodiment of the present invention, an aperiodic CSI reporting time point is calculated not from an aperiodic reporting request reception time point but from a CSI-RS reception time point after the request.

3. Aperiodic PUSCH Reporting Dropping

In aperiodic reporting, if a BS requests a UE to perform a reporting request, the UE feeds back CSI to the BS as a response to the request. Since a CSI-RS is transmitted, unlike a CRS transmitted in every subframe, at a prescribed transmission interval $T_{CSI-RS}$, the BS may transmit successive requests to the UE at a shorter interval than $T_{CSI-RS}$. Namely, the UE may receive an aperiodic reporting request from the BS before receiving a new CSI-RS. In this case, since the CSI-RS has not been updated, CSI that the UE should report is a response to a previous aperiodic reporting request and is the same as CSI which has been reported to the BS. Repetitive reporting of the same CSI wastes UL resources. The UE according to the exemplary embodiment of the present invention may disregard new aperiodic reporting, when receives an aperiodic reporting request from the BS and receives the new aperiodic reporting request after a time shorter than $T_{CSI-RS}$. That is, the UE may drop a response to the new aperiodic reporting request.

According to the above-described embodiments of the present invention, RSs for channel measurement can be transmitted to a UE while minimally affecting other physical signals.

According to the present invention, transmission efficiency of RSs for channel measurement can be raised.

According to the present invention, accuracy of channel measurement performed by a UE based on RSs for channel measurement can be improved.

According to the present invention, a UE can efficiently feed back channel information to a BS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The embodiments of the present invention can be applied to a BS, a UE, or other communication devices in a wireless communication system.

What is claimed is:

1. A method for receiving, by a user equipment, channel state information reference signals (CSI-RSs) for channel measurement in a wireless communication system, the method comprising:
receiving, by the user equipment, transmission information of the CSI-RSs; and
based on the transmission information, receiving, by the user equipment, the CSI-RSs in at least one of plural subframes configured for the CSI-RSs, including a subframe where a synchronization signal or a broadcast signal is present, while assuming none of the CSI-RSs are present in a subframe where a transmission of any CSI-RS of the CSI-RSs collides with a transmission of the synchronization signal or the broadcast signal.

2. The method of claim 1, wherein the user equipment assumes that the CSI-RSs are not transmitted in a subframe where transmission of a CSI-RS of the CSI-RSs collides with transmission of a SystemInformationBlockType 1.

3. The method of claim 1, wherein the transmission information includes at least one of information indicating a number of antenna ports used to transmit the CSI-RSs, information indicating positions of the CSI-RSs within a resource block, and information indicating a transmission period and a subframe offset for the CSI-RSs.

4. The method of claim 1, wherein the plural subframes configured for the CSI-RSs are configured with a CSI-RS periodicity and the synchronization signal and the broadcast signal are configured with respective periodicities.

5. A user equipment for receiving channel state information reference signals (CSI-RSs) for channel measurement in a wireless communication system, the user equipment comprising:
a receiver; and
a processor configured to control the receiver to
receive transmission information of the CSI-RSs; and
based on the transmission information, receive the CSI-RSs in at least one of plural subframes configured for the CSI-RSs, including a subframe where a synchronization signal or a broadcast signal is present, while assuming none of the CSI-RSs are present in a subframe where a transmission of any CSI-RS of the CSI-RSs collides with a transmission of the synchronization signal or the broadcast signal.

6. The user equipment of claim 5, wherein the processor is further configured to assume that the CSI-RSs are not transmitted in a subframe where transmission of a CSI-RS of the CSI-RSs collides with transmission of a SystemInformationBlockType 1.

7. The user equipment of claim 5, wherein the transmission information includes at least one of information indicating a number of antenna ports used to transmit the CSI-RSs, information indicating positions of the CSI-RSs in a resource block, and information indicating a transmission period and a subframe offset for the CSI-RSs.

8. The user equipment of claim 5, wherein the plural subframes configured for the CSI-RSs are configured with a CSI-RS periodicity and the synchronization signal and the broadcast signal are configured with respective periodicities.

9. A method for transmitting, by a base station, channel state information reference signals (CSI-RSs) for channel measurement in a wireless communication system, the method comprising:
transmitting, by the base station, transmission information of the CSI-RSs; and
based on the transmission information, transmitting, by the base station, the CSI-RSs in at least one of plural subframes configured for the CSI-RSs, including a subframe where a synchronization signal or a broadcast signal is present, while transmitting none of the CSI-RSs in a subframe where a transmission of any CSI-RS of the CSI-RSs collides with a transmission of the synchronization signal or the broadcast signal.

10. The method of claim 9, wherein the transmission information includes at least one of information indicating a number of antenna ports used to transmit the CSI-RSs, information indicating positions of the CSI-RSs in a resource block, and information indicating a transmission period and a subframe offset for the CSI-RSs.

11. The method of claim 9, wherein the plural subframes configured for the CSI-RSs are configured with a CSI-RS periodicity and the synchronization signal and the broadcast signal are configured with respective periodicities.

12. A base station for transmitting channel state information reference signals (CSI-RSs) for channel measurement in a wireless communication system, the base station comprising:
a transmitter; and
a processor configured to control the transmitter to:
transmit transmission information of the CSI-RSs; and
based on the transmission information, transmit the CSI-RSs in at least one of plural subframes configured for the CSI-RSs, including a subframe where a synchronization signal or a broadcast signal is present, while transmitting none of the CSI-RSs in a subframe where a transmission of any CSI-RS of the CSI-RSs collides with a transmission of the synchronization signal or the broadcast signal.

13. The base station of claim 12, wherein the transmission information includes at least one of information indicating a number of antenna ports used to transmit the CSI-RSs, information indicating positions of the CSI-RSs in a resource block, and information indicating a transmission period and a subframe offset for the CSI-RSs.

14. The base station of claim 12, wherein the plural subframes configured for the CSI-RSs are configured with a CSI-RS periodicity and the synchronization signal and the broadcast signal are configured with respective periodicities.

\* \* \* \* \*